US012643151B2

(12) United States Patent      (10) Patent No.:   US 12,643,151 B2

Rodkey et al.      (45) Date of Patent:     Jun. 2, 2026

(54) SCHEDULING LASING TASKS OF A 3D PRINTING SYSTEM

(71) Applicant: Freeform Future Corp., El Segundo, CA (US)

(72) Inventors: Samuel Rodkey, McGregor, TX (US); Tasso Lappas, Pasadena, CA (US); Derek Schmuland, El Segundo, CA (US); Grady Wagner, Manhattan Beach, CA (US)

(73) Assignee: Freeform Future Corp., Hawthorne, CA (US)

( * ) Notice: Subject to any disclaimer, the term of this patent is extended or adjusted under 35 U.S.C. 154(b) by 648 days.

(21) Appl. No.: 18/101,408

(22) Filed: Jan. 25, 2023

(65) Prior Publication Data

US 2023/0234138 A1     Jul. 27, 2023

Related U.S. Application Data

(60) Provisional application No. 63/303,868, filed on Jan. 27, 2022.

(51) Int. Cl.
| | |
|---|---|
| *B22F 10/85* | (2021.01) |
| *B22F 10/28* | (2021.01) |
| *B33Y 10/00* | (2015.01) |
| *B33Y 30/00* | (2015.01) |
| *B33Y 50/02* | (2015.01) |

(52) U.S. Cl.
CPC .............. *B22F 10/85* (2021.01); *B22F 10/28* (2021.01); *B33Y 10/00* (2014.12); *B33Y 30/00* (2014.12); *B33Y 50/02* (2014.12)

(58) Field of Classification Search
CPC ...................................................... B22F 10/08
See application file for complete search history.

(56) References Cited

U.S. PATENT DOCUMENTS

| | | |
|---|---|---|
| 2015/0360288 A1 | 12/2015 | Zalewski |
| 2016/0114432 A1* | 4/2016 | Ferrar .................. B23K 26/342 |
| | | 219/76.12 |
| 2020/0238623 A1 | 7/2020 | Umang et al. |
| 2021/0031446 A1* | 2/2021 | Aswathanarayanaswamy ............ |
| | | B22F 10/322 |

OTHER PUBLICATIONS

PCT Search Report and Written Opinion mailed May 3, 2023 for PCT Application No. PCT/US23/11592, 10 pages.

* cited by examiner

*Primary Examiner* — Paul B Yanchus, III
(74) *Attorney, Agent, or Firm* — Lee & Hayes, P.C.

(57)          ABSTRACT

Systems and methods determine a layer of a part to be manufactured within a build module a 3D printing system. Within the layer, lasing tasks to be performed for manufacturing the layer of the part. Constraints are determined that represent one or more limitations associated with at least one of an order or a timing in which the lasing tasks are performed. Based at least in part on the constraints a directed acyclic graph (DAG) is generated that is associated with the at least one of the order or the timing in which the lasing tasks are performed.

20 Claims, 19 Drawing Sheets

116

400

402(2)

402(4)

402(1)

402(3)

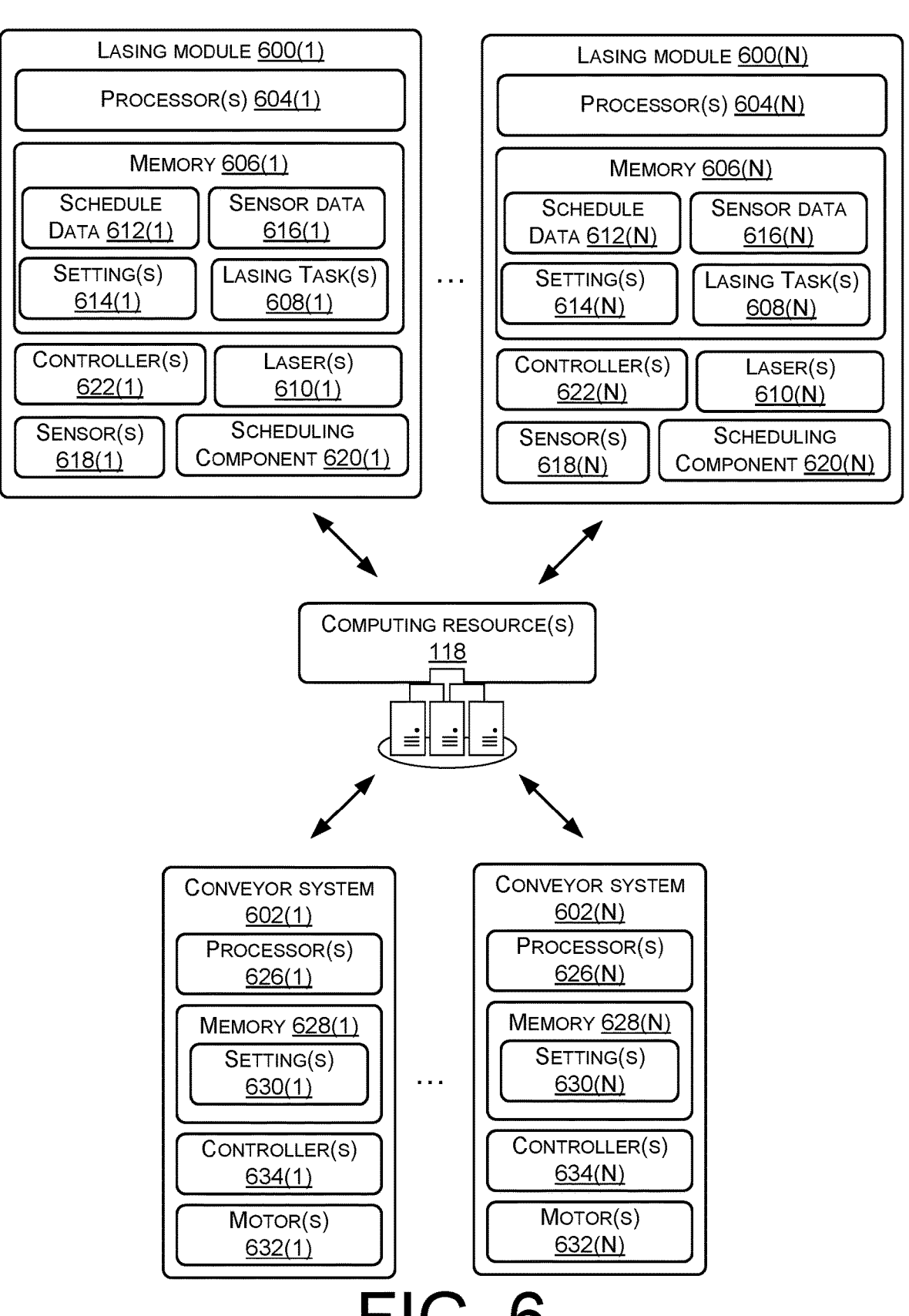

LASING MODULE 600(1)

PROCESSOR(S) 604(1)

MEMORY 606(1)

| SCHEDULE DATA 612(1) | SENSOR DATA 616(1) |
| SETTING(S) 614(1) | LASING TASK(S) 608(1) |

| CONTROLLER(S) 622(1) | LASER(S) 610(1) |
| SENSOR(S) 618(1) | SCHEDULING COMPONENT 620(1) |

LASING MODULE 600(N)

PROCESSOR(S) 604(N)

MEMORY 606(N)

| SCHEDULE DATA 612(N) | SENSOR DATA 616(N) |
| SETTING(S) 614(N) | LASING TASK(S) 608(N) |

| CONTROLLER(S) 622(N) | LASER(S) 610(N) |
| SENSOR(S) 618(N) | SCHEDULING COMPONENT 620(N) |

COMPUTING RESOURCE(S) 118

CONVEYOR SYSTEM 602(1)

PROCESSOR(S) 626(1)

MEMORY 628(1)
SETTING(S) 630(1)

CONTROLLER(S) 634(1)

MOTOR(S) 632(1)

CONVEYOR SYSTEM 602(N)

PROCESSOR(S) 626(N)

MEMORY 628(N)
SETTING(S) 630(N)

CONTROLLER(S) 634(N)

MOTOR(S) 632(N)

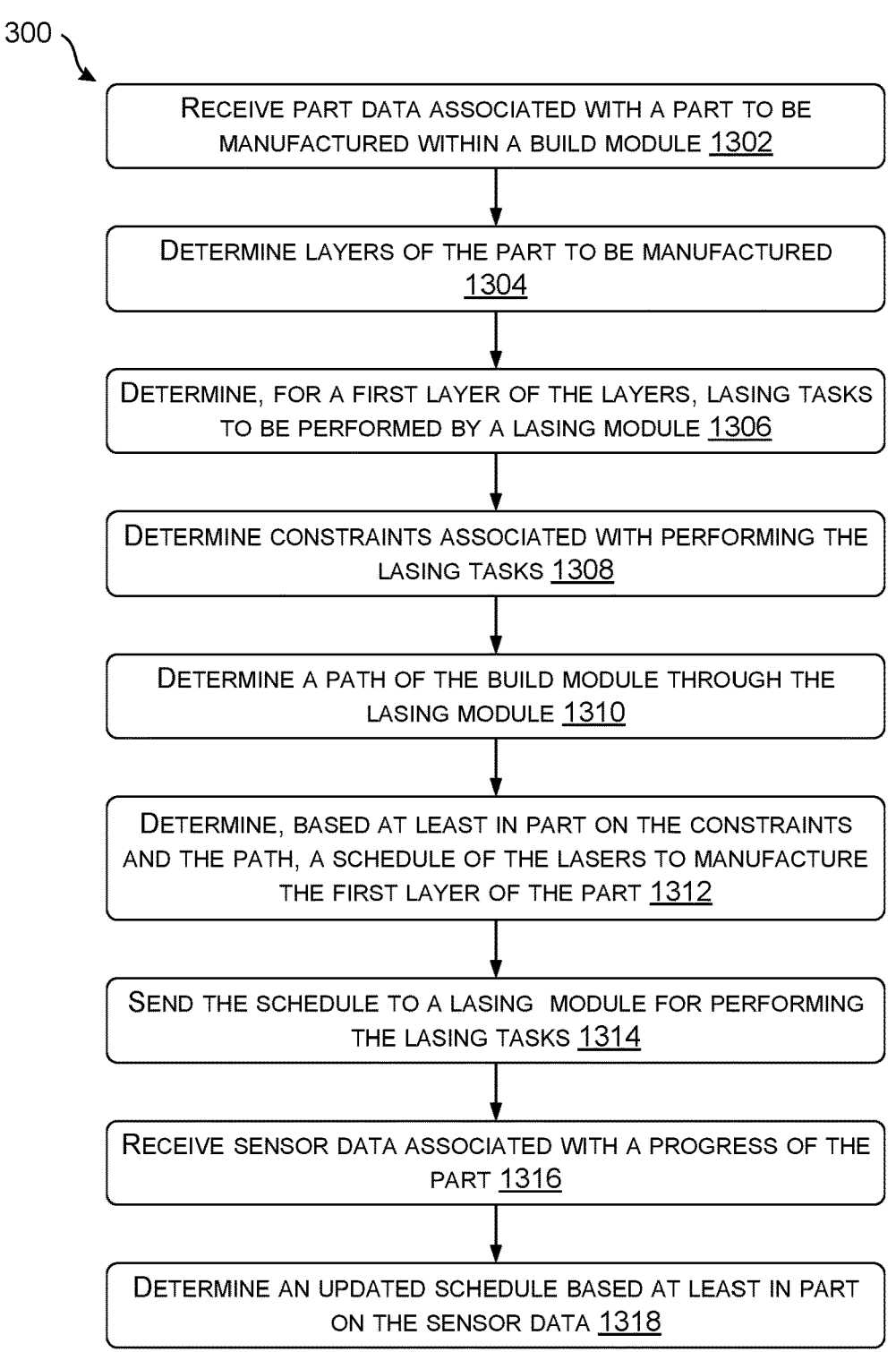

1300

RECEIVE PART DATA ASSOCIATED WITH A PART TO BE MANUFACTURED WITHIN A BUILD MODULE 1302

DETERMINE LAYERS OF THE PART TO BE MANUFACTURED 1304

DETERMINE, FOR A FIRST LAYER OF THE LAYERS, LASING TASKS TO BE PERFORMED BY A LASING MODULE 1306

DETERMINE CONSTRAINTS ASSOCIATED WITH PERFORMING THE LASING TASKS 1308

DETERMINE A PATH OF THE BUILD MODULE THROUGH THE LASING MODULE 1310

DETERMINE, BASED AT LEAST IN PART ON THE CONSTRAINTS AND THE PATH, A SCHEDULE OF THE LASERS TO MANUFACTURE THE FIRST LAYER OF THE PART 1312

SEND THE SCHEDULE TO A LASING  MODULE FOR PERFORMING THE LASING TASKS 1314

RECEIVE SENSOR DATA ASSOCIATED WITH A PROGRESS OF THE PART 1316

DETERMINE AN UPDATED SCHEDULE BASED AT LEAST IN PART ON THE SENSOR DATA 1318

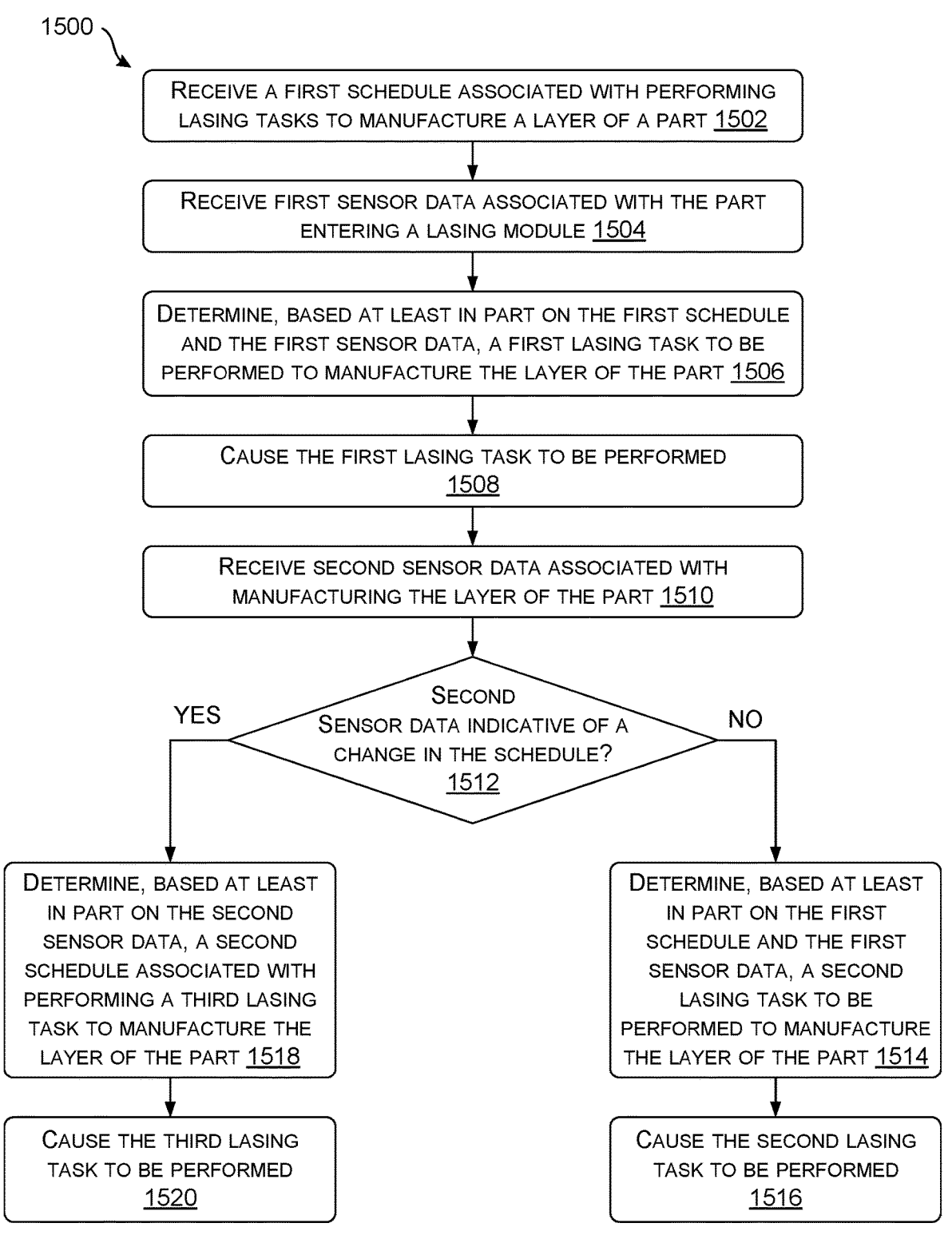

RECEIVE A FIRST SCHEDULE ASSOCIATED WITH PERFORMING LASING TASKS TO MANUFACTURE A LAYER OF A PART 1502

RECEIVE FIRST SENSOR DATA ASSOCIATED WITH THE PART ENTERING A LASING MODULE 1504

DETERMINE, BASED AT LEAST IN PART ON THE FIRST SCHEDULE AND THE FIRST SENSOR DATA, A FIRST LASING TASK TO BE PERFORMED TO MANUFACTURE THE LAYER OF THE PART 1506

CAUSE THE FIRST LASING TASK TO BE PERFORMED 1508

RECEIVE SECOND SENSOR DATA ASSOCIATED WITH MANUFACTURING THE LAYER OF THE PART 1510

SECOND SENSOR DATA INDICATIVE OF A CHANGE IN THE SCHEDULE? 1512

YES

NO

DETERMINE, BASED AT LEAST IN PART ON THE SECOND SENSOR DATA, A SECOND SCHEDULE ASSOCIATED WITH PERFORMING A THIRD LASING TASK TO MANUFACTURE THE LAYER OF THE PART 1518

DETERMINE, BASED AT LEAST IN PART ON THE FIRST SCHEDULE AND THE FIRST SENSOR DATA, A SECOND LASING TASK TO BE PERFORMED TO MANUFACTURE THE LAYER OF THE PART 1514

CAUSE THE THIRD LASING TASK TO BE PERFORMED 1520

CAUSE THE SECOND LASING TASK TO BE PERFORMED 1516

FIG. 15

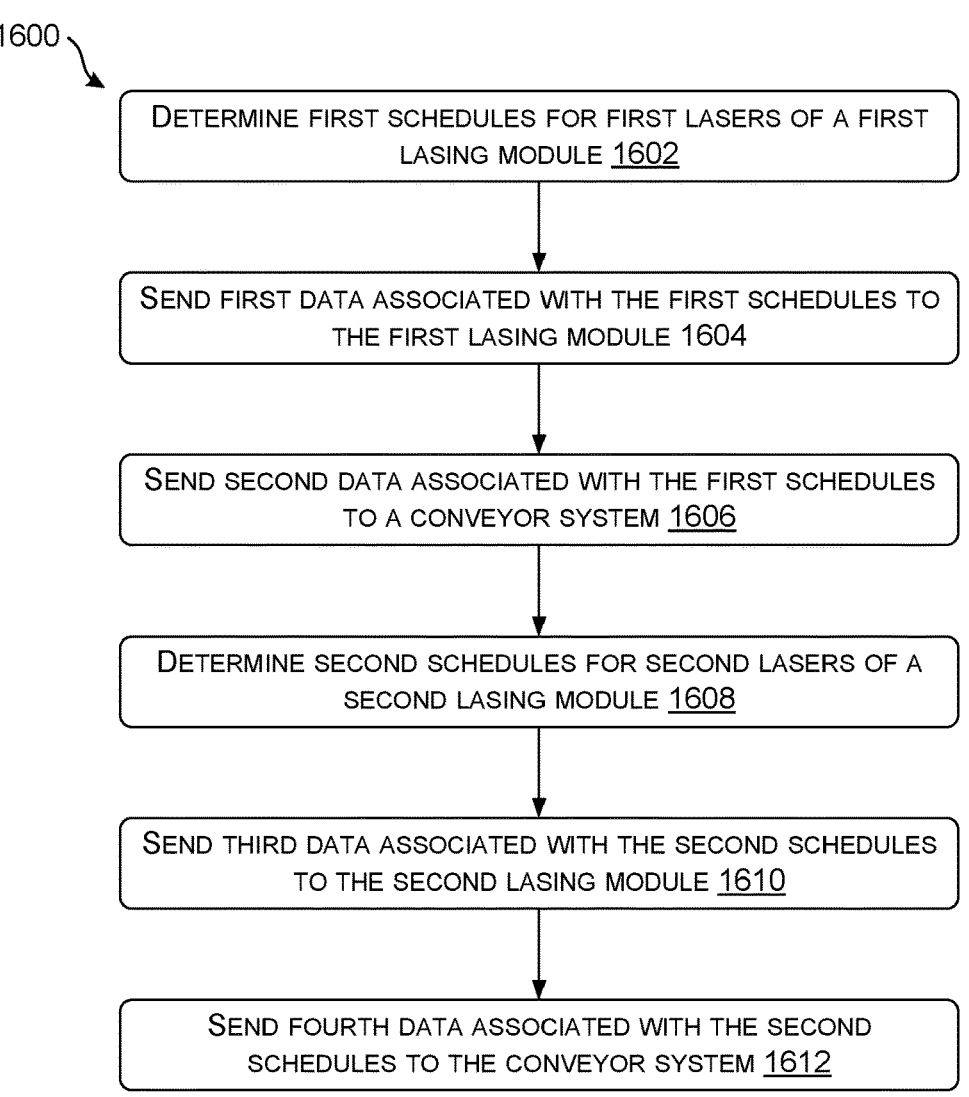

1600

DETERMINE FIRST SCHEDULES FOR FIRST LASERS OF A FIRST LASING MODULE 1602

SEND FIRST DATA ASSOCIATED WITH THE FIRST SCHEDULES TO THE FIRST LASING MODULE 1604

SEND SECOND DATA ASSOCIATED WITH THE FIRST SCHEDULES TO A CONVEYOR SYSTEM 1606

DETERMINE SECOND SCHEDULES FOR SECOND LASERS OF A SECOND LASING MODULE 1608

SEND THIRD DATA ASSOCIATED WITH THE SECOND SCHEDULES TO THE SECOND LASING MODULE 1610

SEND FOURTH DATA ASSOCIATED WITH THE SECOND SCHEDULES TO THE CONVEYOR SYSTEM 1612

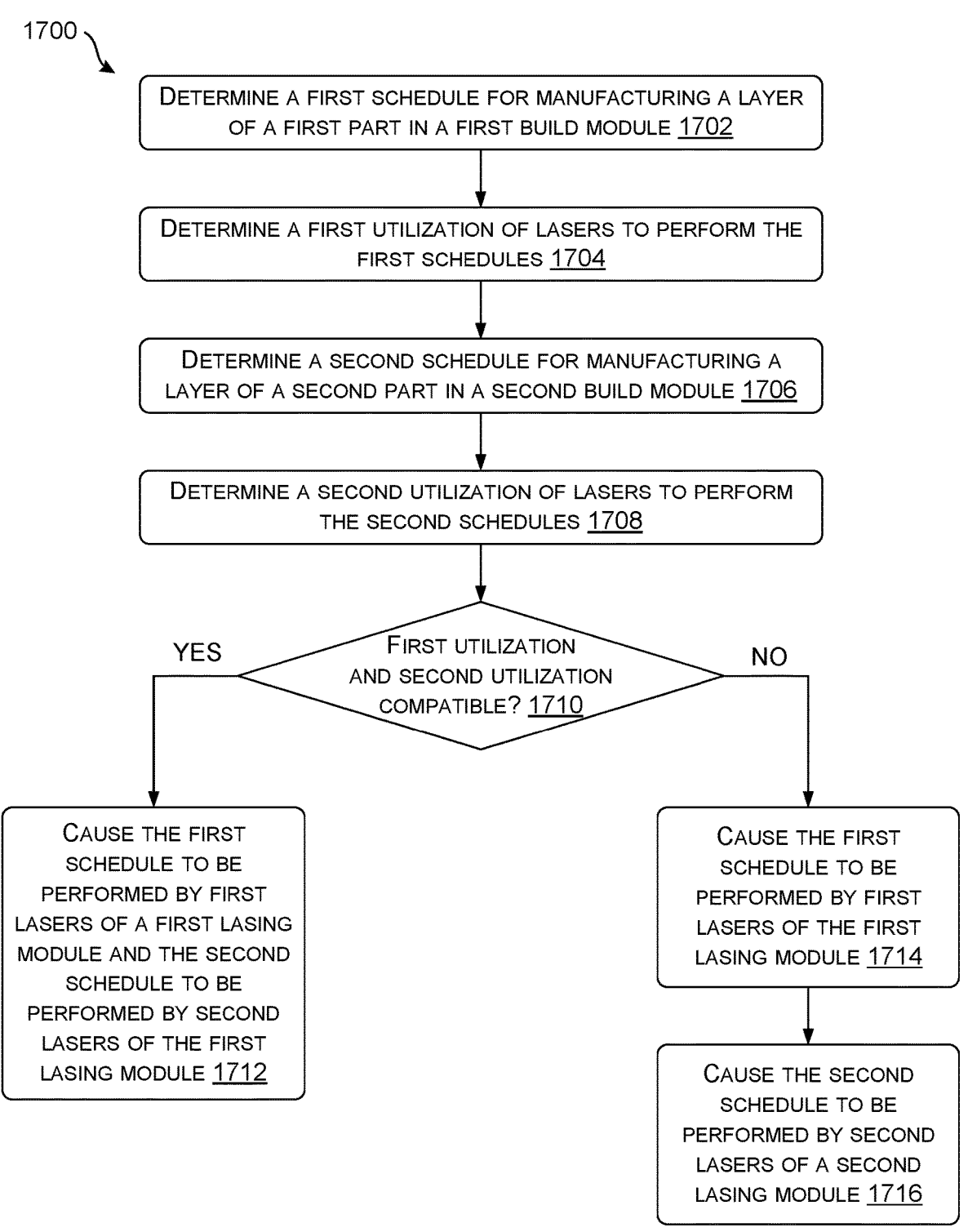

DETERMINE A FIRST SCHEDULE FOR MANUFACTURING A LAYER OF A FIRST PART IN A FIRST BUILD MODULE 1702

DETERMINE A FIRST UTILIZATION OF LASERS TO PERFORM THE FIRST SCHEDULES 1704

DETERMINE A SECOND SCHEDULE FOR MANUFACTURING A LAYER OF A SECOND PART IN A SECOND BUILD MODULE 1706

DETERMINE A SECOND UTILIZATION OF LASERS TO PERFORM THE SECOND SCHEDULES 1708

FIRST UTILIZATION AND SECOND UTILIZATION COMPATIBLE? 1710

YES

NO

CAUSE THE FIRST SCHEDULE TO BE PERFORMED BY FIRST LASERS OF A FIRST LASING MODULE AND THE SECOND SCHEDULE TO BE PERFORMED BY SECOND LASERS OF THE FIRST LASING MODULE 1712

CAUSE THE FIRST SCHEDULE TO BE PERFORMED BY FIRST LASERS OF THE FIRST LASING MODULE 1714

CAUSE THE SECOND SCHEDULE TO BE PERFORMED BY SECOND LASERS OF A SECOND LASING MODULE 1716

FIG. 17

SCHEDULING LASING TASKS OF A 3D PRINTING SYSTEM

CROSS-REFERENCE TO RELATED APPLICATIONS

This application claims priority to U.S. Provisional Application No. 63/303,868, filed Jan. 27, 2022, entitled "Scheduling Lasing Tasks of a 3D Printing System," the entirety of which is herein incorporated by reference.

BACKGROUND

Additive manufacturing or 3D printing offers multiple benefits over traditional manufacturing processes. For example, additive manufacturing allows for more complex parts to be manufactured, eliminating many of the design constraints of previous manufacturing processes. Additionally, additive manufacturing can reduce material cost and waste. However, print times are relatively long and throughput for existing additive manufacturing systems is low compared to conventional manufacturing processes. Also, existing additive manufacturing techniques have not been as robust, stable, and/or repeatable as conventional manufacturing processes. Accordingly, there is a need for improvements to additive manufacturing processes and techniques.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIG. 6 illustrates example computing components of lasing modules and conveyor systems, respectively, for manufacturing parts using the 3D printing system of FIG. 1, according to an example of the present disclosure.

FIG. 13 illustrates an example process for scheduling lasing tasks for one or more 3D printing systems, according to an example of the present disclosure.

FIG. 15 illustrates an example process for dynamically updating a schedule for one or more 3D printing systems, according to an example of the present disclosure.

FIG. 16 illustrates an example process for determining schedules and sending the schedules to components of one or more 3D printing systems, according to an example of the present disclosure.

FIG. 17 illustrates an example process for optimizing a use of lasers within a 3D printing system, according to an example of the present disclosure.

DETAILED DESCRIPTION

Figure 1:
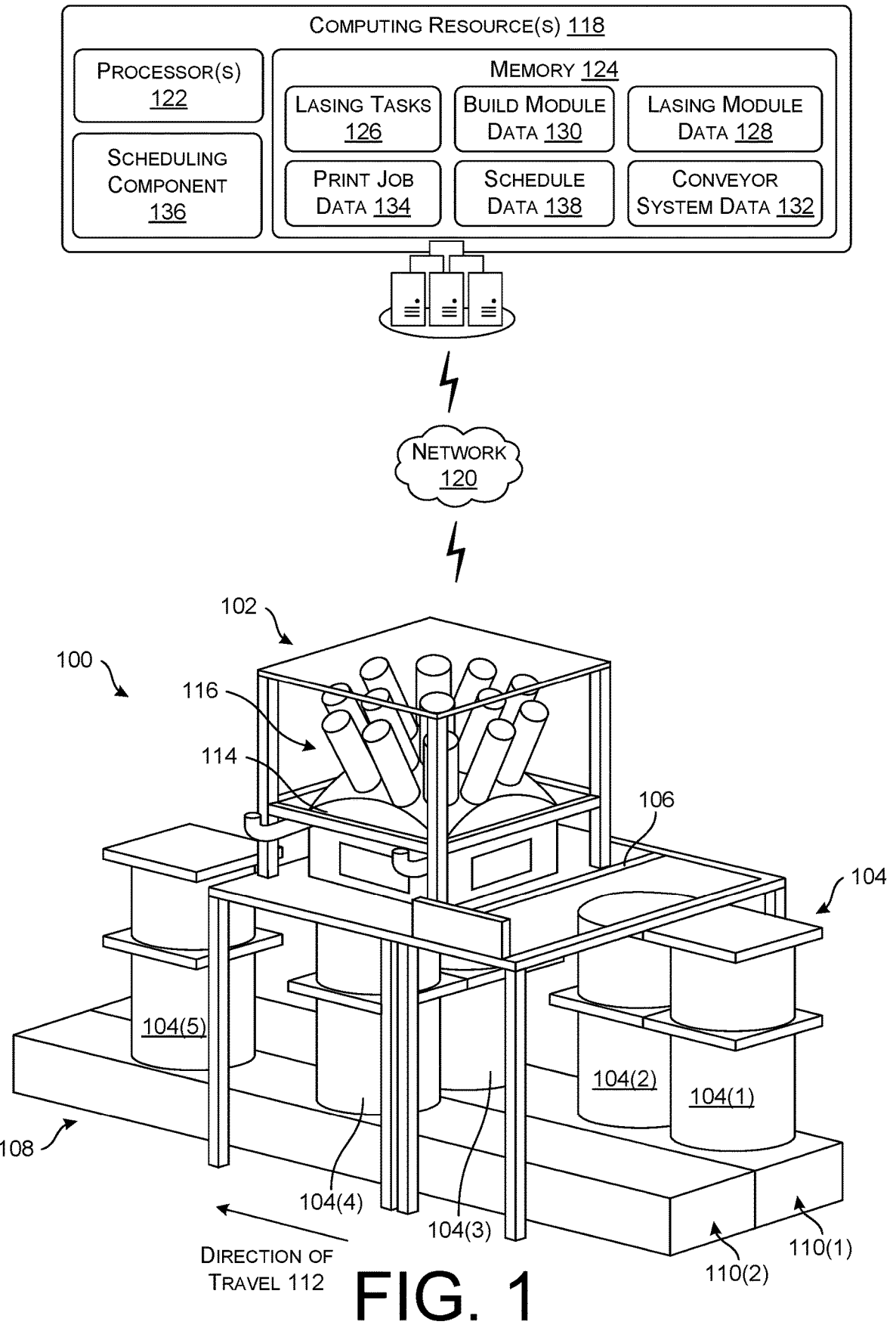
FIG. 1 illustrates an example additive manufacturing system or 3D printing system, according to an example of the present disclosure, which includes a lasing module disposed above one or more build modules. The lasing module includes a plurality of optical modules having components, such as lasers, for melting powdered metal within or on the build modules. Computing resource(s) may be in communication with the lasing module and/or conveyor systems for causing lasing tasks to be performed for manufacturing parts within or on the build modules.

This patent application is directed, at least in part, to systems and methods that determine schedules for manufacturing parts using a 3D printing system. As used herein, the terms "additive manufacturing" and "3D printing" are used interchangeably. The 3D printing system includes heat sources, such as lasers, that are directed to a build area within a powder bed of metal. For a given part to be manufactured by the 3D printing system, the part may be segmented into a plurality of layers. Additionally, each layer may be segmented into a plurality of lasing tasks that are to be performed by one or more lasers of the 3D printing system. The lasers are scheduled to perform lasing tasks for manufacturing layers of the part, and the lasing tasks are associated with a time at which the lasers are to perform the lasing tasks. In some instances, scheduling the lasing tasks may be based on constraints of the lasers, the 3D printing system, and/or the part being manufactured. For example, certain lasing tasks within a layer may be performed prior to other lasing tasks, or certain lasers may have geometrical constraints limiting regions on a build module that the respective lasers can target. Additionally, in some instances, a schedule of the lasing tasks may be updated during operation (e.g., in real time or substantially real time) based on changing conditions or characteristics of the 3D printing system, such as unexpected delays in manufacturing or decommissioning of lasers. In some instances, the systems and methods described herein may allow for (1) scheduling of lasing tasks for lasing modules, (2) scheduling of lasing tasks during movement of the build modules, and/or (3)

scheduling of lasing tasks across a plurality of lasing modules within an environment. As such, the systems and methods herein allow for improved throughput, precision, robustness, efficiencies in additive manufacturing.

The 3D printing system may include one or more lasing modules and one or more build modules. The lasing module(s) and the build module(s) may be separate components of the 3D printing system to allow multiple different build modules to be used interchangeably with one or more of the lasing modules. For example, within an environment (e.g., facility), a conveyor system (or other motive system) may transfer build modules between any number of lasing modules. In some examples, after parts or layers of a part are manufactured in a particular build module, during a cooling of material within the build module, and/or during a recoating of powdered metal on the build area, another build module may be interchanged with the previous build module beneath a respective lasing module. In some examples, lasing modules may be lasing (e.g., melting) material on one or more multiple build modules while the build modules are in motion. For instance, the conveyor system may direct the build modules into and/or out of alignment with the lasing module(s) for manufacturing parts. Additionally, the conveyor system may maneuver the build modules to allow each lasing module to consistently manufacture parts across a plurality of build modules simultaneously and/or sequentially and with minimal downtime. While conveyor systems are described to move build modules around a factory or other location, in other examples other types of motive systems may be used (e.g., rails, tracks, cranes, etc.).

The lasing module(s) may be disposed vertically above (e.g., overhead) the build module(s). Each lasing module may include lasers that generate laser beams for melting powdered metal disposed on a build area within or on the respective build modules. In some instances, the lasing module(s) includes a dome-shaped structure (e.g., geodesic dome, hemisphere, etc.) to which the lasers couple. Coupling the lasers to the dome-shaped structure in this manner disposes the lasers at various orientations relative to the build module (or the build areas). In doing so, the laser beams generated by the lasers may include different incident angles on the build module(s) for manufacturing parts or layers of the part.

The lasing modules may also include mirror(s) and/or lens(es) for directing or "steering" the laser beams towards the build area, as well as altering characteristic(s) of the laser beam (e.g., spot size, focal length, etc.). In some instances, a plurality of mirror(s) and/or lens(es) may be used to steer, or otherwise direct, the laser beams towards a particular location or locations within the build area. Sensor(s) are arranged on the lasing module, the build module, etc. to determine and provide feedback regarding a position, orientation, and/or movement of the build modules for increasing an accuracy and precision in manufacturing parts. For example, feedback from the sensor(s) may be used to adjust the mirror(s) and/or lens(es) of the laser(s) of the lasing module.

The build modules include a container for receiving the powered metal and within or on which the parts are manufactured. During a manufacture of parts (or layers of the parts), the lasers are directed onto the build areas of one or more build modules for melting the powdered metal. In doing so, the laser(s) create melt pools of powdered metal and as the melt pools solidify, structures of the part are formed. Additionally, in some instances, the lasing modules may manufacture parts on multiple build modules simultaneously and/or sequentially. That is, the lasers of the lasing module may be directed to build areas across build modules. In such instances, parts (or layers) may be manufactured within disparate build modules and the lasers may be steered to respective build areas for manufacturing the parts. For example, in some instances, the lasers may be steered to four build areas across four build modules for manufacturing the respective parts within the build modules.

The 3D printing system may also be configured to manufacture parts during a movement of the build modules relative to (e.g., through) the lasing module(s) to increase a utilization of the lasers. For example, the build modules may be moved (e.g., by the conveyor system) into and out of the lasing module for being acted on by the lasers. As the build module traverses relative to the lasing modules, the lasers may be directed onto the build areas. In such instances, the build modules may move at a constant or dynamic speed relative to the lasing module. Additionally, the conveyor system may translate the build module in multiple directions relative to the lasing module (e.g., side to side (laterally), rotationally, backwards/forwards (longitudinally), etc.).

Scheduling of Lasing Tasks for Lasing Module

The systems and methods disclosed herein schedule lasing tasks to be performed by the lasers to manufacture parts within the 3D printing system. In some instances, each lasing task is assigned to a laser of a particular lasing module as well as a time interval in which the laser is to complete the lasing task. In other words, the lasers are scheduled to execute the lasing tasks, and the schedule indicates the time at which the lasing task is to begin and end. The lasers of the lasing module may each have a queue (e.g., list, commands, etc.) of lasing tasks and the lasers may perform the lasing tasks in order (as indicated in the queue). Lasers across the lasing modules, such as different lasing modules throughout the environment, may each respectively have a queue. Additionally or alternatively, in some examples, a system level queue of lasing tasks may be maintained for all lasers of all lasing modules in the 3D printing system, or a facility. As the lasing tasks are performed by the lasers, the layers of the part are manufactured. As such, across the environment, at any given time, any number of lasers of the 3D printing system may be performing respective lasing tasks for manufacturing any number of parts across build modules.

Initially, as part of determining the lasing tasks, the part may be segmented into layers. The layers represent sections of the part being created, and each successive layer is printed on top of a previous layer to create the part. Within each layer, lasing tasks are created and the lasing tasks are associated with melting powdered metal and manufacturing the part, layer by layer. For example, parts may have any number of layers, and within each layer, individual lasing tasks represent a piece or segment of the layer to be melted. The lasing tasks are defined by boxes, squares, regions, or other areas on the layers that are melted by the lasers. In some instances, the lasing tasks may be associated with the same or different sized regions, and each lasting task may be assigned to a single laser or multiple lasers. For example, multiple lasers of a lasing module, or a single laser of the lasing module, may be assigned to complete a lasing task. Completion of the lasing tasks for a particular layer results in a manufactured layer of the part. In other words, once a set of lasing tasks is completed for a layer, the layer of the part is completed. However, although described as lasing tasks, the 3D printing system may be associated with other tasks, such as recoating, moving the build module, cooling the material, and so forth in order to manufacture the part.

Additionally, diagnostic tasks may be executed when the lasing modules and/or the build modules are not needed for lasing. Here, the lasing module and the build modules may perform diagnostic tasks in pre-defined sequences or commands, and these diagnostic tasks may be recorded, monitored, or otherwise observed. Feedback may verify an overall functionality or performance of the system on a recurring basis for improving system operations. For example, if the results of a diagnostic task indicates that one of the lasers is malfunctioning, that laser may be removed from a pool of available lasers for subsequent scheduling. In such instances, the schedule of the layers may be adjusted in real-time as lasers become available and/or unavailable.

Information associated with the lasing tasks may also be determined for use in scheduling the lasing tasks. This information, for example, may include a duration to complete the lasing task, settings of the laser to complete the lasing task, such as laser power, laser focus, laser beam velocity on the build area, a size of the lasing task (e.g., extent of the lasing task relative to the overall build area, or other lasing tasks), an angle of incidence of a laser relative to the build surface, an orientation of the lasing task on the build area, and so forth. The information may assist in characterizing the lasing task for scheduling lasers. In some instances, and as discussed herein, the information may be used to determine lasers of the lasing module that are capable of (or preferred for) performing the lasing tasks and/or to determine the order in which the lasing tasks are carried out. For example, a location of the lasing task on the layer may be used when scheduling the laser task. In some instances, an operator of the 3D printing system may input the information associated with the lasing tasks (e.g., via an user interface, input module, etc.).

In some instances, the lasing tasks are associated with certain constraints to ensure a quality of the part. The constraints may represent limitations or conditions when scheduling the lasing task, or which laser(s) are scheduled to perform lasing tasks. In other words, the constraints are used as a set of rules to determine how the lasing tasks are scheduled, as well as which lasers are scheduled to perform the lasing tasks. In some instances, the constraints may be determined for each part (or layer) based on restrictions associated with the 3D printing system, the lasing tasks themselves, and/or to ensure the quality of the part. In some instances the constraints may be modulated (e.g., heightened, loosened, etc.) depending on the quality of the part sought. For example, the quality of the part may be lessened in order to complete the lasing tasks more quickly. In some instances, the constraints may limit when the lasing tasks are performed in relation to one another.

For example, certain lasing tasks may have to be completed before other lasing tasks are scheduled. These constraints may represent predecessor/successor constraints that constrain performance of a lasing task before performance of another lasing task. In this example, a second lasing task may be completed (or scheduled) only after a first lasing task is completed. Such a constraint, for example, may be based on a location of the first lasing task relative to the second lasing task in a same or different layer. This type of constraint may be considered a conjunctive constraint that limits certain lasing operations being performed before other lasing tasks are completed.

Additionally, certain lasing tasks may not be performed at the same time as one another. For example, as the lasers melt the powdered metal, a plume of soot, debris, and/or gases may be generated. Here, lasing tasks that are located within or downstream of the plume (or other region of influence) may not be performed at the same time. This may reduce an impact of the plume on the laser(s) performing other lasing tasks. This type of constraint, for example, may represent a disjunctive constraint that constrains certain lasing tasks being performed simultaneously. For example, a lasing task located downstream of another lasing task may not be performed at the same time given the effects of the plume. Such region of the plume may be based on the information associated with the lasing task (e.g., laser intensity), direction of gas flow, incident angle, and so forth, and may be monitored using one or more cameras or other sensors and fed back to the 3D printing system in substantially real time.

Additionally constraints may include maximum incident angles of the lasers, layer-to-layer constraints (e.g., temperatures), speed constraints, spatial constraints, visibility constraints (e.g., not all of the lasing tasks may be visible by the lasers at all times, such as when the build module enters or exits the lasing module), process constraints, such as forming a contour of the lasing task before filling in the core, and so forth. In some instances, the constraints are determined to ensure a quality of the manufactured part. In some examples, the constraints may be adjustable (e.g., lessened or relaxed) to increase a speed of manufacturing, or increased or tightened in order to further increase quality and/or precision of parts manufactured by the system. As such, for a given part, the constraints may be determined based upon characteristics desired of the part being manufactured. In some instances, the level of constraints may be set by the operator of the 3D printing system, or predetermined constrains may be set back on a size of the part, size of the lasing tasks, powered metal, etc. Regardless, once the constraints are determined the constraints may be used to determine an order (sequence) of the lasing tasks. For example, the constraints impose limits on the lasing tasks and the order in which the lasing tasks are scheduled.

In some instances, the constraints are used to generate an adjacency list or a directed acyclic graph (DAG). The DAG represents an order in which the lasing tasks are performed and the constraints may represent edges in the DAG. The DAG may be generated based on the constraints, as well as the timing and spatial relationships amongst the lasing tasks. For example, the DAG will not violate constraints that are imposed in order to ensure a quality of the part. After the constraints are determined for a particular layer, the DAG may be generated.

Knowing the order of lasing tasks and using the DAG, lasers may be assigned to the lasing tasks based at least in part on the location of the lasers within the lasing module. For example, the systems and methods disclosed herein may schedule one or more specified lasers to perform the lasing tasks. Scheduling the lasers may involve determining which lasers are capable of performing the lasing tasks. For example, and as noted above, each laser may have a certain incident angle on the portion of the build area at which a lasing task is to be performed, and the incident angle may affect lasing tasks that a laser is capable of performing. For example, certain lasers may not be able to be perform certain lasing tasks (or may not perform them as well) if they are oriented at certain angles relative to the build module. Moreover, the incident angle may affect a quality of the part being manufactured, and certain lasers may be limited to performing certain lasing tasks.

Scheduling of Lasing Tasks During Movement of the Build Modules

In some instances, given the location of the lasing task on the layer and/or the location of build module relative to the lasing module, certain lasing tasks may not be capable of being performed until the building module is further advanced into the lasing module. That is, given the motion of the build module relative to the lasing module, the motion may impact which lasing tasks are performed before others. To this point, the movable nature of the build modules may affect those lasers that are capable of performing the lasing task. The build modules may be moved into and out of the lasing modules, such that the build modules may be positioned at different locations relative to the lasers of the lasing modules. The different locations of the build module allows different lasers and/or combinations of lasers to complete the lasing tasks at different times. For example, different lasers may be capable of performing lasing tasks on a build module at different times as the build module translates along a path relative to the lasing module. As part of this, the location of the build module and the time at which the laser is capable of performing the lasing task may be determined. Those lasers that are capable of performing lasing tasks may satisfy the constraints. That is, given the movable nature of the build module by the conveyor system, the build module may be moved relative to the lasing module to allow lasers to complete the lasing tasks.

The movement of the build module may allow for lasers that were once unable to complete the lasing task to become capable of completing the lasing task. In other words, at a first instance and while the build module is in a first location, a laser may not meet one or more constraints. However, at a second instance and while the build module is in a second location, the laser may meet the constraint(s). As such, the movement of the build module relative to the lasing module may permit access to additional lasers at different locations of the build module, which may increase an amount of lasing tasks capable of being performed by the lasers and thereby increase the rate at which parts can be manufactured using the 3D printing systems described herein.

After determining those lasers that are capable of performing the lasing tasks, the lasing tasks may be scheduled for lasers in accordance with the constraints and the location of the lasers to ensure a quality of the part. In some instances, multiple lasers may be capable of performing a respective lasing task. That is, lasers may be paired with lasing tasks, and the schedule may indicate a best-suited or optimized laser/lasing task pair. In some instances, a list of the lasers/lasing tasks is generated and the lasing module selects which laser is to perform the lasing task based on sensed conditions (e.g., speed, timing, etc.). The schedule may therefore indicate all possible laser/lasing task pairs that satisfy the constraints, and may choose laser/lasing task pairs that optimize the system for quality, speed, or balance of quality and speed.

The schedule may represent a list of lasing tasks to be performed for manufacturing the layer. As part of determining the schedule, lasing tasks may be assigned to lasers along with a time at which the lasers are to complete the task. This ensures that lasing tasks that have to be scheduled before other lasing tasks or lasing tasks that cannot be completed at the same time as other lasing tasks are taken into consideration. Each laser may include a respective list of lasing tasks (e.g., queue), as well as a time at which the laser is to perform those lasing tasks.

In some instances, the schedule is determined ahead of time and prior to manufacturing of the part. For example, the systems and methods may determine the schedule and then transmit the schedules to the lasing module, the build modules, and/or other components of the 3D printing system. In that case, the lasing module, for example, may carry out the schedule by instructing certain lasers to complete respective lasing tasks. However, as noted above, the systems and methods also allow updates to the schedules on-the-fly based on changing conditions. For example, delays may be introduced that affect downstream lasing tasks being carried out by the lasing module. As another example, lasers may become unavailable at certain times (e.g., decommissioned, busy completing other lasing tasks, etc.). In such instances, theses changing conditions may impact future lasing tasks that are to be carried out.

The 3D printing system, such as the lasing module, may monitor a performance or progress of the lasing tasks. If lasing tasks become delayed or certain lasers that were previously scheduled to complete a lasing task are unavailable, an updated schedule may be determined. The updated schedule, for example, may be based on the constraints as noted above, as well as lasers that are available. For example, the lasing module may determine, based on the DAG and the location of the build module relative to the lasing module, lasers that are capable of performing the lasing task. The lasing module may schedule a laser for completing the lasing task. Such determination may be based on previous combinations of lasers and lasing tasks. This process may be performed periodically or may be continuous such that queues are constantly updated based on the sensed conditions within the build module, an availability of lasers within the lasing module, and so forth.

Scheduling of Lasing Tasks Across Lasing Modules

The above discussion is with regard to scheduling lasers within a single lasing module. However, the environment may include a plurality of lasing modules that are configured to manufacture parts, layer by layer, across a plurality of build modules. For example, a lasing module may direct first lasers to a first layer on which a first part is manufactured in a first build module, and direct second lasers to a second layer on which a second part is manufactured in a second build module. Additionally, the build modules may progress along a path past multiple different lasing modules, such that layers of the part are progressively formed by multiple lasing modules as the build module traverses along the path. In some instances, the build module may move back and forth between and among multiple different lasing modules. Still, in some examples, the 3D printing system may include multiple different lasing modules having different capabilities or configurations (e.g., different numbers of lasers, different types of lasers, different sizes of lasers, etc.). In such instances, based on the different capabilities and/or configuration of the lasing modules, the lasing modules may be scheduled to complete certain lasing tasks.

In some instances, and as part of scheduling, the systems and methods may optimize a use of the lasers and the time it takes to manufacture a part (or layers of a part). For example, for a particular build module, the lasers may be scheduled to complete lasing tasks for a layer in a way that optimizes the use of the lasers. That is, the lasers may be assigned to lasing tasks to maximize their utilization (e.g., limit a downtime of the lasers). This may include adjusting a position of the build module relative to the lasing module, adjusting (e.g., increasing or decreasing) a speed of the build module relative to the lasing module, and so forth. Additionally, lasers may be scheduled in a way that optimizes the use of the lasers across lasing modules. That is, lasers from a single lasing module may act on build areas across the build modules and scheduled in a way that the lasers are efficiently used across the build modules. In this example, if lasers of a lasing module are not efficiently used, then lasing tasks may be assigned to the lasing module to optimize the use of the lasers.

In some instances, the build modules may be directed, via the conveyor system, to certain lasing modules within an environment in a way that optimizes the lasers across lasing modules. Throughout the environment, for example, the build modules may be transferred between lasing modules via the conveyor system. Here, the build modules may be scheduled for lasing tasks by certain lasing modules in a manner that optimizes the use of the lasers across the lasing modules. In some instances, the schedules are optimized to maximize throughput of the lasing modules through the factory. In such optimization, the lasers may be scheduled with minimal downtime. However, the schedules may be optimized according to other variables, such as quality or cost.

The systems and methods described herein enable sustainable manufacturing of parts with improved manufacturing speed, accuracy, precision, stability, and repeatability. The systems and methods, or the 3D printing system, also reduces manufacturing time, relative to existing systems, by manufacturing parts as build modules are in motion relative to lasing modules. Due to the movement of the build modules the lasers are also efficiently utilized with minimal downtime. Additionally, lasers are scheduled to complete lasing tasks within layers of the parts to make efficient use the lasers. The movement of the build modules also introduces additional freedom in scheduling the lasing tasks. In some instances, the lasers are scheduled to complete lasing tasks based on certain constraints that serve to ensure part quality, reduce downtime, increase manufacturing throughput, and so forth. Additionally, by monitoring a progress of the part, the schedule may be updated and lasing tasks may be rescheduled. Such rescheduling accounts for unexpected delays, failures or faults of lasers or other system components, new lasing tasks, and load-balancing across the lasing modules. Such process results in improved throughput, scalability, accuracy, fault tolerance, and precision in manufacturing parts.

Additional details of lasing modules and build modules that may be used in connection with the 3D printing systems and scheduling techniques described herein can be found in U.S. Patent Application No. 17,944,883, filed Sep. 14, 2022, entitled "Lasing Module for 3D Printing System" and U.S. patent application Ser. No. 17/944,901, filed Sep. 14, 2022, entitled "3D Printing System with Moving Build Module," the entirety of which are incorporated herein by reference.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting examples. The features illustrated or described in connection with one example may be combined with the features of other examples. Such modifications and variations are intended to be included within the scope of the appended claims.

FIG. 1 illustrates an example 3D printing system 100 used to manufacture parts. In some instances, the 3D printing system 100 includes a lasing module 102 and one or more build modules 104. The lasing module 102 is shown residing vertically above (e.g., overhead) the build modules 104. In some instances, the lasing module 102 (or a structure thereof) couples to a gantry 106 that disposes the lasing module 102 above the one or more build modules 104.

As shown in FIG. 1, the build modules 104 may include at least a first build module 104(1), a second build module 104(2), a third build module 104(3), a fourth build module 104(4), and/or a fifth build module 104(5). The first build module 104(1), the second build module 104(2), the third build module 104(3), the fourth build module 104(4), and/or the fifth build module 104(5), as well as other the build modules 104, are configured to pass underneath the lasing module 102 (and/or the gantry 106) such that the lasing module 102 may build parts within a bed of powdered material disposed in containers of the build modules 104, respectively. Each of the first build module 104(1), the second build module 104(2), the third build module 104(3), the fourth build module 104(4), and the fifth build module 104(5), as well as other the build modules 104, include respective build areas on which parts are manufactured. For example, containers (e.g., drums, bins, etc.) associated with each of the build modules 104 may include a bed of powdered metal in which parts are manufactured. The lasing module 102 is arranged to manufacture parts across the build modules 104 as the build modules pass underneath (e.g., through) the lasing module 102.

The build modules 104 may be conveyed via a conveyor assembly or a conveyor system 108 (e.g., tracks, rollers, belts, etc.) into the lasing module 102. In other words, the conveyor system 108 may move the build modules 104 into and out of the lasing module 102 such that parts may be built across the build modules 104, or across a plurality of build modules 104. In some instances, the conveyor system 108 may move the build modules 104 while the lasing module 102 is manufacturing parts. In some instances, the conveyor system 108 may include roller(s), belt(s), motor(s), wheel(s), and the like for translating the build modules 104. For example, the conveyor system 108 may convey the build modules 104 into and out the lasing module 102. The conveyor system 108 may convey the build modules 104 at certain speeds such that the lasing module 102 is able to track the build modules 104 and compensate for a motion of the build modules 104 to melt the powdered metal as the build modules 104 are in motion.

In some instances, the conveyor system 108 may include multiple lanes on which the build modules 104 are disposed, or along which the build modules 104 traverse. For example, the conveyor system 108 may include a first lane 110(1) and/or a second lane 110(2). The first lane 110(1) and the second lane 110(2) may respectively convey the build modules 104 into the lasing module 102. That is, with reference to FIG. 1, the first build module 104(1), the second build module 104(2), and the third build module 104(3) are shown being disposed in the first lane 110(1). The fourth build module 104(4) and the fifth build module 104(5) are shown being disposed in the second lane 110(2). The first lane 110(1) may provide the first build module 104(1), the second build module 104(2), and the third build module 104(3) to the lasing module 102, and the second lane 110(2) may provide the fourth build module 104(4) and the fifth build module 104(5) to the lasing module 102. In some instances, each of the lanes 110 of the conveyor system 108 may be independently controlled to provide the build modules 104 to the lasing module 102. For example, the first lane 110(1) may provide the build modules 104 at a first speed into and relative to the lasing module 102, while the second lane 110(2) may provide the build modules 104 at a second speed into and relative to the lasing module 102. In some instances, the speeds may be different or similar. Moreover, the build modules 104 may be rotated on the lanes 110, respectively, to adjust an orientation of the build modules 104 relative to the lasing module 102.

Although FIG. 1 illustrates a certain number of build modules 104 disposed on the conveyor system 108 (e.g., five), the conveyor system 108 may convey more than or less than the number of build modules 104 shown in FIG. 1. Additionally, the build modules 104 may be provided to different lasing modules 102 within an environment, and the conveyor system 108 may at least assist in transferring the build modules 104 across different multiple lasing modules 102. The conveyor system 108 may also translate or transfer the build modules 104 between the lanes 110 of the conveyor system 108. Moreover, the conveyor system 108 may include more than two lanes 110 for providing the build modules 104 to the lasing module 102. Still, in some instances, separate conveyor systems 108 may provide the build modules 104 to the lasing module 102. Here, the conveyor system 108 may respectively provide build modules 104 to the lasing modules 102. As such, it is to be understood than an environment may include any number of lasing modules 102, build modules 104, and/or conveyor systems 108 to convey the build modules 104.

The build modules 104 may be provided to the lasing module 102 in a direction of travel 112 (as indicated by the arrow in FIG. 1). As the build modules 104 are conveyed on the conveyor system 108, and pass beneath the lasing module 102, the lasing module 102 may manufacture parts within the build areas of the build modules 104, respectively. In this sense, the lasing module 102 may manufacture parts while the build modules 104 are moving along the conveyor system 108, and may manufacture parts across the build modules 104. For example, the lasing module 102 includes lasers that are steered (e.g., via mirrors) to locations on the build areas for melting the powdered metal. In some instances, the conveyor system 108 may move the build modules 104 laterally (transverse to the direction of travel 112) and/or longitudinally (along the direction of travel 112) relative to the lasing module 102. In such instances, the conveyor system 108 may be bi-directional and translate the build modules 104 in multiple directions. Still, the conveyor system 108, or the build module 104, may include components for rotating the build module 104 relative to the lasing module 102.

With reference to FIG. 1, the third build module 104(3) and the fourth build module 104(4) are shown residing beneath the lasing module 102. Laser(s) of the lasing module 102 may generate beams that are steered to a build area of the third build module 104(3) and the laser(s) (whether the same or different laser(s)) generate beams that are steered onto a build area of the fourth build module 104(4). The laser(s) within the lasing module 102 may be capable of reaching build areas (or a portion of the build areas) within each of the third build module 104(3) and the fourth build module 104(4).

After the build modules 104 pass through (e.g., beneath) the lasing module 102, the build modules 104 may be conveyed to different lasing modules within an environment, or may be conveyed back into the lasing module 102. For example, after passing through the lasing module 102, the powdered metal within the build modules 104 may be allowed time to cool (e.g., cure) before additional coats of powdered metal are deposited onto the build area and/or before additional manufacturing takes place. As an example, after passing through the lasing module 102, the fifth build module 104(5) may be recirculated (via conveyors not shown) back to the lasing module 102. During this recirculation, the powdered metal within the fifth build module 104(5) may cure and cool before additional melting takes place.

Additionally, the build area of the fifth build module 104(5) may be recoated with additional layer(s) of powdered metal. For example, a recoater may be located on a side (end) of the lasing module 102 for applying layers of powdered metal. The recoater may include a rake or other mechanism that supplies (deposits) the powdered metal into the build area. For example, as parts are being manufactured, powdered metal may be disposed in a powder bed in layers, one layer at a time, within the build area. While recoating is occurring, other build modules 104 may be conveyed into the lasing module 102.

The lasing module 102 includes a housing 114 that receives a plurality of optical modules 116 of the lasing module 102. The lasers may be disposed within or couple to the optical modules 116. The housing 114 may include a top, a bottom, and sides. The top (e.g., ceiling) is shown being disposed vertically away from the build modules 104, whereas the bottom is shown being disposed adjacent to the build modules 104. The sides are shown disposed between the top and the bottom. In some instances, the top of the housing 114 may be spaced apart from the build modules 104 by a distance that permits the lasers within the lasing modules 102 to manufacture parts within a build area having dimensions of, for example, 750 mm×750 mm. This build area may span across multiple build modules 104, within the same or different lanes 110 (e.g., as shown in FIG. 1).

In some instances, the sides may include one or more windows that permit viewing of the build area in which parts are manufactured. The top, the bottom, and the sides may collectively define a cavity, such as a processing chamber, within which the parts are manufactured. As such, the bottom may be open-end such that laser beams generated by the optical modules 116 may be transmitted to the build modules 104 (and the powdered metal within the build areas) for building parts. The processing chamber may act as a hood for controlling off gases and/or soot generated via melting the powdered metal. Additionally, although not shown in FIG. 1, one or more hoses (or other ductwork) may be fluidly connected to the housing 114. A supply hose, for example, may supply air or shielding gas into the processing chamber, while an exhaust hose may draw air or other gasses from within the processing chamber (e.g., via a fan). The supply hose and the exhaust hose may prevent a buildup of off gases and/or soot generated during a manufacture of the parts (e.g., vaporized powdered metal).

The profile of the top of the housing 114 orients the optical modules 116 at a plurality of angles relative to the build modules 104 (and therefore the build areas). For example, as shown, the optical modules 116 may be situated as an array, across and about the top, so as to be oriented towards the build areas of the build modules 104. In some instances, any number of optical modules 116 may couple to the top, or stated alternatively, the lasing module 102 may include any number of the optical modules 116. Additionally, the optical modules 116 themselves may include any number of laser(s) that generate respective laser beams directed towards the build areas. For example, the optical modules 116 may include two lasers, where each of the laser beams generated by lasers may be independently or collectively (e.g., clustered) steered (e.g., via mirror(s)). As such, the lasers may be used individually and collectively when manufacturing parts. Additionally, lens(es) of the optical modules 116 may control a spot size of the laser beams on the build areas. An optical pathway of the laser beams may be modified to steer the laser beam toward selective portions of the surface of the powder bed to melt powdered metal, thus creating melt pools at the selected portions of the powder bed surface. Examples of components of the lasing module 102 and controlling the laser beams are discussed in U.S. patent application Ser. No. 17/944,883, filed Sep. 14, 2022, the entirety of which is herein incorporated by reference.

The build modules 104, as discussed above, may move in and out of the lasing module 102 as parts are manufactured across the build modules 104, or as layers of the parts are completed. Sensor(s) may image fiducials, encoder tape, or other markers (e.g., barcodes, QR codes, etc.) on the build modules 104 to account for the movement, position, and/or orientation of the build modules 104 entering the lasing module 102. In some instances, the sensor(s) may be arranged on the lasing module 102, the build module 104, the gantry 106, the conveyor system 108, about an environment of the 3D printing system 100, and/or other frames. Based on the movement, position, and/or orientation of the build modules 104, the laser beams may be steered to certain positions within the build areas and/or the laser beams may be focused to create certain spot sizes.

In some instances, the sensor(s) may measure a velocity at which the build modules 104 pass underneath the lasing module 102, as well as a relative position of the build module 104 to the lasing module 102, thereby allowing the lasing module 102 to manufacture parts while the build modules 104 are moving. Furthermore, as the build modules 104 enter the lasing module 102, the sensor(s) may image the markers for obtaining information associated with the part being manufactured within particular build modules. This allows the optical modules 116 (or the lasers) to be instructed (e.g., steered) for manufacturing parts. For example, after the markers are imaged, such image(s) may be used to determine a progress of the part, a layer of the part to be manufactured, a location of the part within the build module 104, and so forth. Such information may be used to control the optical modules 116 for manufacturing the part. Examples of sensing the build modules are discussed in U.S. patent application Ser. No. 17/944,901, filed Sep. 14, 2022, the entirety of which is herein incorporated by reference.

In some instances, the lasing module 102 is in communication with computing resource(s) 118 via a network 120. In some instances, the computing resource(s) 118 may be a component of the 3D printing system 100, or may be a component separate from the 3D printing system 100. The computing resource(s) 118 may be implemented as one or more servers and may, in some instances, form a portion of a network-accessible computing platform implemented as a computing infrastructure of processors, storage, software, data access, etc. that is maintained and accessible via a network such as the Internet. The computing resource(s) 118 does not require end-user knowledge of the physical location and configuration of the system that delivers the services. Common expressions associated for the computing resource(s) 118 include "on-demand computing", "software as a service (Saas)", "platform computing", "network-accessible platform", "cloud services", "data centers", etc. However, in some instances, the computing resource(s) 118 may be located within a same environment as the 3D printing system 100. The network 120 is representative of any type of network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The computing resource(s) 118 are shown including processor(s) 122 and memory 124, where the processor(s) 122 may perform various functions and operations associated with controlling the 3D printing system 100, such as scheduling lasing tasks 126 for the lasers of the optical modules 116, and the memory 124 may store instructions executable by the processor(s) 122 to perform the operations described herein. The memory 124 is shown storing or having access to lasing module data 128, build module data 130, conveyor system data 132, and/or print job data 134. The lasing module data 128 may include identifiers or information associated with the lasing modules 102. Such information may be used when communicating with the individual lasing modules 102. In some instances, the lasing modules 102 may represent lasing modules of a single 3D printing system, or may represent lasing modules across one or more 3D printing systems. For example, an environment may include a plurality of lasing modules 102 for manufacturing parts, and the lasing module data 128 may be utilized when communicating with the individual lasing modules 102 for manufacturing parts, respectively. In some instances, the lasing module data 128 further includes characteristics of the optical modules 116 associated with the lasing module 102, such as laser beam power, usage (e.g., availability), location (e.g., on the housing 114), spot size, steering location, lens(es) and/or mirror(s) orientation, and so forth. Such information may be used for knowing a state of the lasing modules 102. Additionally, the lasing module data 128 may indicate lasing tasks 126 of the lasing modules 102 (both scheduled and performed), a functionality of the lasing modules 102, or lasers thereof, usage, and so forth. Such information may be used when scheduling the lasing modules 102 for repair or replacement, redirecting other lasing modules 102 to manufacture parts assigned to the non-operational lasing modules 102, or scheduling of the lasing tasks 126.

The build module data 130 may include information associated with the build modules 104, such as a location of the build modules 104 within an environment, a part being manufactured within the build module 104, layers of parts being manufactured within the build module 104, lasing tasks of the layers of the part, a type of powdered material in the build module 104, a size of the build module 104 (or a container thereof), and so forth. In some instances, the build module data 130 may be generated by sensor(s) disposed about the environment, the lasing modules 102, and/or the conveyor systems 108 for tracking the location of the build modules 104. The location of the build module 104 may be tracked throughout an environment as the build modules 104 traverse the conveyor system 108. Such information may be utilized when instructing the lasing modules 102 (and the optical modules 116 to manufacture certain parts), and/or the conveyor systems 108 to transport the build modules 104 to certain locations or the lasing modules 102 within the environment. Additionally, such information may be utilized for altering components of the lasing modules 102, such as the mirror(s) and/or lens(es) within the optical modules 116, for steering the laser beams and/or focusing the laser beams of the optical modules 116, respectively. Altering the components of the lasing modules 102 in this manner accounts for shifts in the build modules 104 as the build modules 104 traverse the environment and along the conveyor system 108 to accurately and precisely manufacture parts.

The conveyor system data 132 may include information associated with the conveyor system 108. Such information, for example, may be used for routing the build modules 104 to respective lasing modules 102 within the environment. The conveyor system data 132 may indicate portions of the conveyor system 108 that route to respective lasing modules 102. The conveyor system data 132 may also indicate the lanes 110. The conveyor system data 132 may be used by the computing resource(s) 118 to communicate and instruct motors of the conveyor system 108 for maneuvering the build modules 104 to respective lasing modules 102. In other words, the computing resource(s) 118 may communicate with the conveyor system 108 for directing the build modules 104 to particular lasing modules 102.

The print job data 134 may correspond to parts that are to be built within the build modules 104. For example, the print job data 134 may indicate sides, surfaces, features, and so forth that make up or form the part. The print job data 134 may also indicate layers of the part that are to be manufactured, where the layers make up the part. The print job data 134 may be used in conjunction with the lasing module data 128 and the build module data 130 for manufacturing the parts. For example, the lasing modules 102 may be instructed to manufacture parts queued in the print job data 134.

As part of this process, the lasing modules 102 or the lasers of the optical modules 116 may be instructed or scheduled to perform the lasing tasks 126. The lasing tasks 126 may represent actions, commands, instructions, or tasks that the lasers are to perform in order to manufacture the part, layer by layer. For example, each layer may include a plurality of the lasing tasks 126 that are to be performed by one or more lasers of the 3D printing system 100. The layers of the part may be segmented into a plurality of lasing tasks that are associated with a particular section, region, zone, or section of the layer. Completion of the lasing tasks 126 results in a completed layer of the part. Additionally, the lasing tasks 126 may be performed in a particular order, relative to one another, for example, to ensure a quality of the part being manufactured.

To determine the lasing tasks 126, as well as the order in which the lasing tasks 126 are to be performed, the computing resource(s) 118 are shown including a scheduling component 136. The scheduling component 136 may determine a list of lasing tasks 126 that are to be performed by the lasers at a given instance or moment in time as the build modules 104 pass through the lasing module 102. For example, the scheduling component 136 may process, or otherwise define constraints associated with the lasing tasks 126, and output schedules that are in accordance with the constraints. The scheduling component 136 schedules the lasing tasks 126 for manufacturing layers of the part, and the lasing tasks 126 are associated with a time at which the lasers perform the lasing tasks 126.

As discussed herein, the scheduling component 136 may utilize the constraints or other limitations for scheduling the lasing tasks 126. For example, certain lasing tasks 126 may be completed before or after other lasing tasks 126. Additionally, certain lasing tasks 126 may be restricted from being performed at the same time (e.g., simultaneously, concurrently, etc.) as other lasing tasks 126. These constraints, for example, may affect the order in which the lasing tasks 126 are scheduled. Additionally, a location of the lasers relative to the lasing tasks 126 may affect a quality of the parts. For example, as noted above, given the shape of the housing 114, the lasers may be oriented at respective incident angles to the build modules 104. These incident angles, for example, if too severe, may impact a quality of the part. As such, based on the location of the lasing task 126 and/or the laser, certain lasers may be constrained to performing certain lasing tasks 126.

The scheduling component 136 generates a schedule represented within schedule data 138. The schedule data 138 indicates an assignment of lasing tasks 126 to the lasers as well as a time interval in which the laser is to complete the lasing task 126. The schedule generated by the scheduling component 136 may take into consideration the constraints of the lasing tasks 126 (e.g., order), a location of the lasing tasks 126, a location of the build module 104, a speed of the build module 104, and so forth. As will be discussed herein, a DAG may be used for a mathematical representation of the constraints to generate the schedule. For example, the constraints of the lasing tasks 126 may be represented within the DAG. The schedule data 138 may be representative of a queue (e.g., list, commands, etc.) of the lasing tasks 126 that are to be performed by the lasers. Lasers across lasing modules 102, such as different lasing modules 102 throughout a facility, may respectively have a schedule. As parts are manufactured, lasers progress through respective schedules to perform the lasing tasks 126. Across a facility, any given number of lasers may be performing respective lasing tasks 126 for manufacturing any number of parts across build modules 104. As will be discussed in detail herein, the scheduling component 136 (or other components of the computing resource(s) 118) may coordinate the scheduling of the lasing tasks 126 across the build modules 104 and the lasing modules 102 for manufacturing the parts. In some instances, the schedule data 138 indicates possible laser and lasing task pairs and the lasing module 102 selects which pair is implemented based on sensed conditions.

For example, each of the lasing tasks 126 may be associated with a preference list based on the current location, orientation, and speed. The preference list may indicate, for each of the lasing tasks 126, a preferred order of lasers to perform the lasing task 126. In some instances, the scheduling component 136 picks the lasing module 102 that satisfies the preference list, and the preference list may take into consideration the constraints of the lasing tasks 126. So, if a lasing task 126 is preferably performed by a first laser, a second laser, and a third, and so on, in that order, the scheduling component 136 will attempt to assign the first laser, if available, and if not, the second laser, and so on.

Additionally, as part of determining the schedules or after determining the schedules, the computing resource(s) 118 control or instruct the lasing modules 102 and the conveyor systems 108. For example, depending on a part to be manufactured, a particular layer of the part, or a particular lasing task 126, the computing resource(s) 118 may transmit instructions to the lasing modules 102, respectively, for steering mirror(s) towards a particular location on the build area. The instructions may be associated with the lasing tasks 126, such that lasers carry out the lasing tasks 126 in accordance with the instructions. For example, the instructions may indicate an amount of power emitted by laser(s) of the lasing modules 102 and/or a focal point of lens(es) of the optical modules 116. Such control may change a spot size associated with the laser beams emitted by the optical modules 116 of the lasing modules 102, respectively. Moreover, the computing resource(s) 118 may instruct the conveyor systems 108 to transport the build modules 104 to certain locations within the environment, at certain speeds, to certain lasing modules 102, as so forth for manufacturing the parts. In other examples, the computing resources(s) 118 may determine the schedules, and the lasing module 102 may be tasked with carrying out the schedules and controlling the lasers accordingly (e.g., spot size, steering, etc.).

The schedule data 138 is transmitted to the lasing modules 102 and in turn, the lasers of the lasing modules 102 may carry out performance of the schedule. In some instances, the lasing modules 102 themselves may include controller(s), switches, processor(s), memory, and the like that are configured to perform or carry out the schedules.

Additionally, the lasing modules 102 may be configured to determine new or updated schedules based on a status of the lasing module 102. For example, if a laser of the lasing module 102 is non-operational, the lasing module 102 (or a component thereof) may determine a new laser to complete the lasing task 126 previously assigned to the non-operational laser. This dynamic and real-time adjustment of the schedule may take into consideration unexpected disturbances in the schedule to continue a manufacture of parts.

Although the disclosure herein describes that the build modules 104 are moving while parts are manufactured, in some instances, the build modules 104 need not be moving and the lasing module 102 may be used to manufactured parts while the build modules 104 are stationary. For example, there may be some instances, such as large or complex parts, where the build modules 104 are slowed or stopped below the lasing module 102 for a period of time.

The processor(s) 122 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein may be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory 124 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which may be used to store the desired information and which may be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which may be used to store the desired information and which may be accessed by the processor(s).

Figure 2:
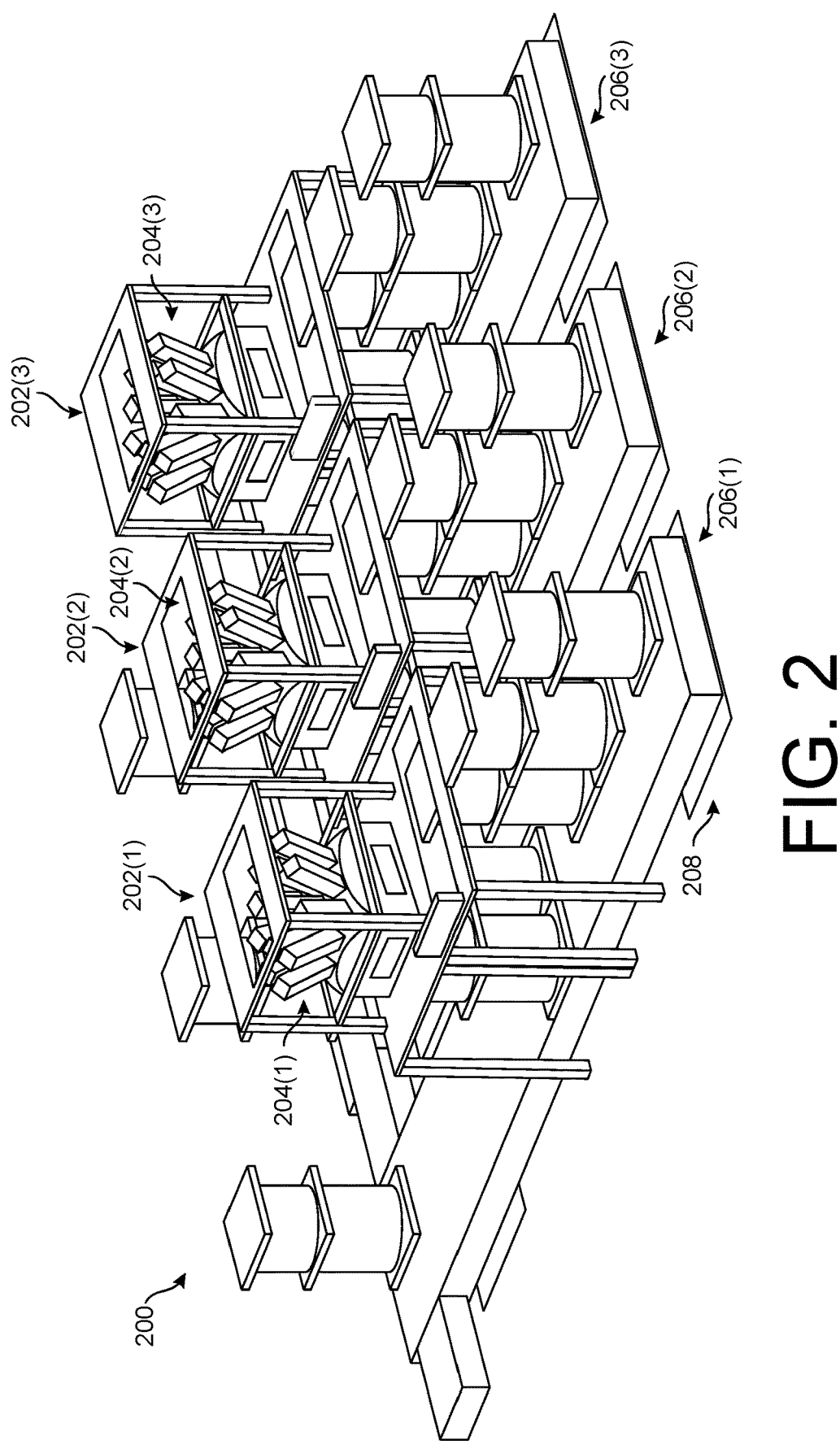
FIG. 2 illustrates an example environment including a plurality of 3D printing systems, according to an example of the present disclosure.

FIG. 2 illustrates an example environment 200 including a plurality of 3D printing systems, such as a first 3D printing system 202(1), a second 3D printing system 202(2), and a third 3D printing system 202(3). However, the environment 200 may include any number of 3D printing systems.

The first 3D printing system 202(1), the second 3D printing system 202(2), and the third 3D printing system 202(3) may be similar to the 3D printing system 100 as described above. For example, each of the 3D printing systems 202(1)-(3) may include respective lasing modules 204(1)-(3) configured to direct laser beams onto build modules 206(1)-(3). The lasing modules 204(1)-(3) may include any number of optical modules 116 for generating the laser beams that are directed onto build areas of the build modules 206(1)-(3), respectively. As shown, the build modules 206(1)-(3) are arranged in multiple lanes that direct the build modules 206(1)-(3) to the lasing modules 204(1)-(3), respectively. In some instances, two lanes may supply the respective build modules 206(1)-(3) to the lasing modules 204(1)-(3). The lasing modules 204(1)-(3) may therefore be configured to steer laser beam(s) to across build modules 206(1)-(3) conveyed along the lanes. Additionally, the build modules 206(1)-(3) may progress along a path through multiple different lasing modules 204(1)-(3), such that layers of the part are progressively formed by multiple lasing modules 204(1)-(3) as the build module 206(1)-(3) traverses along the path. In some instances, the build modules 206(1)-(3) may move back and forth between and among multiple different lasing modules 204(1)-(3).

In some instances, the environment 200 includes a conveyor system 208, which may include similar components as the conveyor system 108. The conveyor system 208 may represent a central conveyor system that conveys the build modules 206(1)-(3) across the lasing modules 204(1)-(3). For example, the conveyor system 208 may be capable of transporting the build modules 206(1)-(3) between the lasing modules 204(1)-(3). As such, the build modules 206(1)-(3) may not be associated with respective lasing modules 204(1)-(3), but may be configured to pass between the lasing modules 204(1)-(3) for manufacturing parts depending on the loads of the lasing modules 204(1)-(3), for example. To permit the transfer of the build modules 206(1)-(3) across the lasing modules 204(1)-(3), the conveyor system 108 may include track shifters (e.g., gripping mechanism) and/or motors that may be selectively activated for controlling a movement of the build modules 206(1)-(3). The conveyor system 208 may also include rotators for changing an orientation of the build modules 206(1)-(3). However, in some instances, the environment 200 may include individual conveyor systems that convey the build modules 206(1)-(3) to the lasing modules 204(1)-(3), respectively.

Each of the lasing modules 204(1)-(3) may be in communication with the computing resource(s) 118 as introduced above in FIG. 1. For example, the computing resource(s) 118 may determine schedules for each of the lasers within the lasing modules 204(1)-(3) and then transmit the schedules to the lasing modules 204(1)-(3). As noted above, the schedules may include the lasing tasks 126 that the lasers are to perform for the layers being manufactured. For example, each of the lasers of the lasing modules 204(1)-(3) may be performing respective lasing tasks 126 on parts being manufactured within the build modules 206(1)-(3). As such, the computing resource(s) 118 may coordinate the performance of the lasing tasks 126 across the lasing modules 204(1)-(3) and in accordance with the schedules. In addition, the conveyor system 108 may be controlled to steer or otherwise direct the build modules 206(1)-(3) to respective lasing modules 204(1)-(3)

Figure 3:
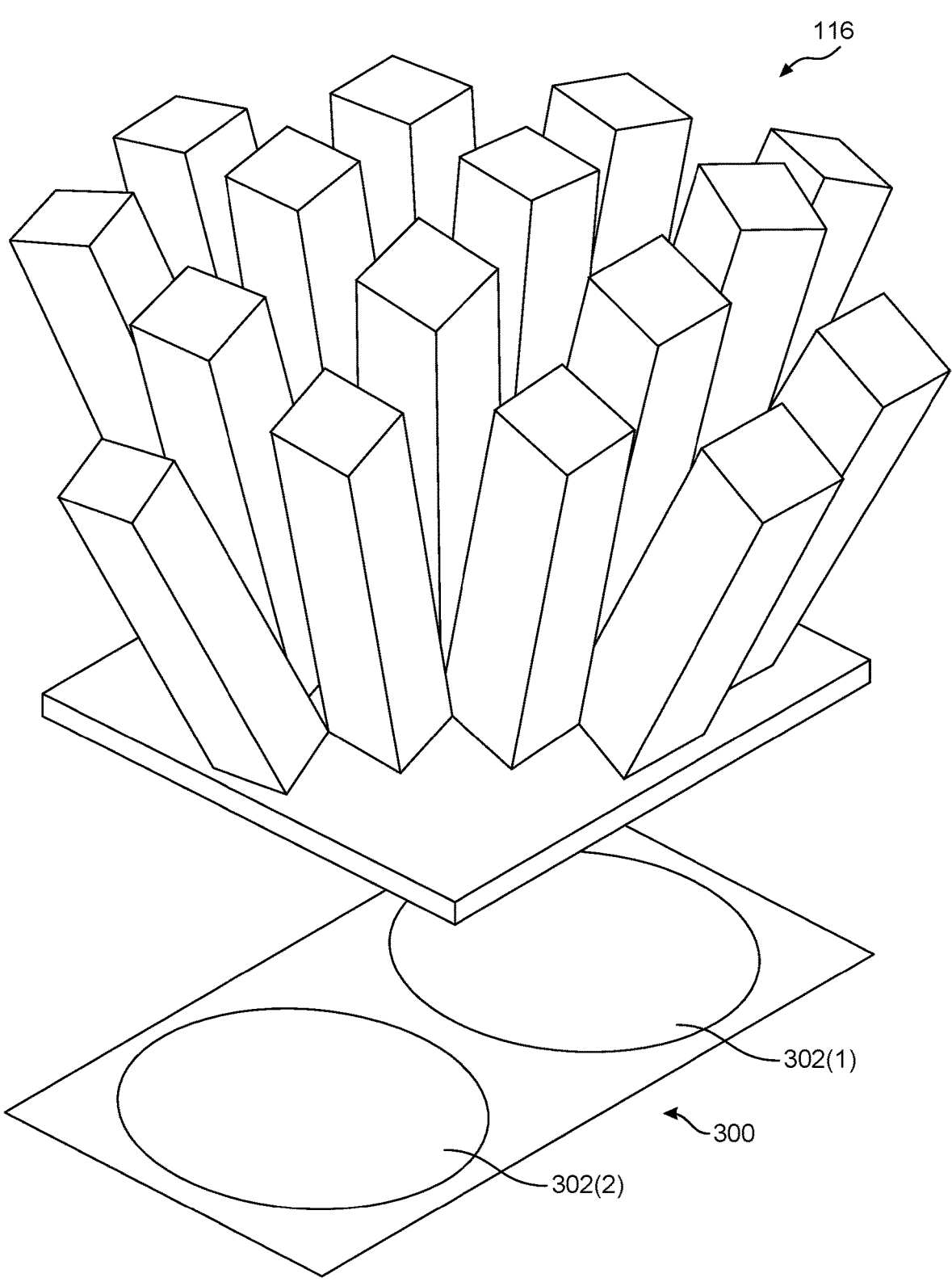
FIG. 3 illustrates an example build area associated with the lasing module of the 3D printing system of FIG. 1, according to an example of the present disclosure.

FIG. 3 illustrates an example build area 300 disposed beneath the optical modules 116 of the lasing module 102, such that the optical modules 116 are mounted overhead of the build area 300.

In some instances, the build area 300 may include at least a first portion 302(1) and a second portion 302(2). In reference to FIG. 1, the first portion 302(1) may be disposed within the third build module 104(3), and the second portion 302(2) may be disposed within the fourth build module 104(4). As such, the lasing module 102 may be configured to manufacture parts within separate containers of the build modules 104 at the same time. Lasers within the optical modules 116 may be scheduled to perform respective lasing tasks 126 within the first portion 302(1) and the second portion 302(2) in accordance with the schedule data 138.

In some instances, each of the optical modules 116 of the lasing module 102 may be capable of being steered towards a portion, or all of, the build area 300 (e.g., mirror(s)). In such instances, the field of views of the individual optical modules 116, or the lasers contained therein, may overlap. In some instances, the field of view of the laser may be substantially the same, or equal to, the build area 300. For example, the optical modules 116 may be arranged such that all of the lasers within the optical modules 116 may be steered towards any position within the build area 300. However, as noted above, each of the lasers may have a different incident angle onto the build area 300, or the first portion 302(1) and the second portion 302(2). The incident angle may affect the quality of the part being manufactured, and in such instances, lasers may be constrained to performing the lasing tasks 126 on the build area 300. For example, lasers located overhead of the first portion 302(1) may be directed to the first portion 302(1), while lasers located overhead of the second portion 302(2) may be directed to the second portion 302(2). However, as noted herein, the build modules 104 may be translated relative to (e.g., through) the lasing module 102 such that, in some instances, the lasers once located overhead of the first portion 302(1) may be located overhead of the second portion 302(2).

The laser beams generated within the optical modules 116 may be steered towards the first portion 302(1) and/or the second portion 302(2), depending on the parts being manufactured within the third build module 104(3) and the fourth build module 104(4), respectively, an amount of the first portion 302(1) and/or the second portion 302(2) within the view of view of the lasers, a velocity of the third build module 104(3) and the fourth build module 104(4), respectively, a placement of the optical modules 116 on the lasing module 102, an orientation of the optical modules 116, and/or an availability of the lanes. Such steering may be in accordance with the schedule transmitted from the computing resource(s) 118, for example.

Additionally, or alternatively, rather than steering the laser beams to respective portions in the build area 300, the laser beams may be clustered together to create larger melt pools. In general, a cluster includes two or more laser beams that at least partially overlap each other in a region of the powder bed within the build module 104. For example, laser beam(s) may be clustered together to increase an amount of power directed to a particular location within the build area 300 (e.g., for a particular lasing task 126). This increase in power may create larger spot sizes, or melt pools. Each of the lasers may therefore be independently, or collectively operable to create separate or multiple parts simultaneously, with flexible energy delivery. In turn, this allows the lasers to be highly utilized and continuously operate with minimal downtime. Examples of clustering or beamforming laser beams are described in U.S. patent application Ser. No. 16/773,864 filed Jan. 27, 2020, the entirety of which is herein incorporated by reference.

Although the first portion 302(1) and the second portion 302(2) are shown being circular in shape, the first portion 302(1) and the second portion 302(2) may include different shapes (e.g., square, hexagonal, triangular, etc.). In such instances, the containers and/or the build modules 104 may be of different shapes (e.g., square). In some instances, the build area 300 may include a size of approximately 750 mm×750 mm. Still, the build area 300 may include more than two portions.

Figure 4:
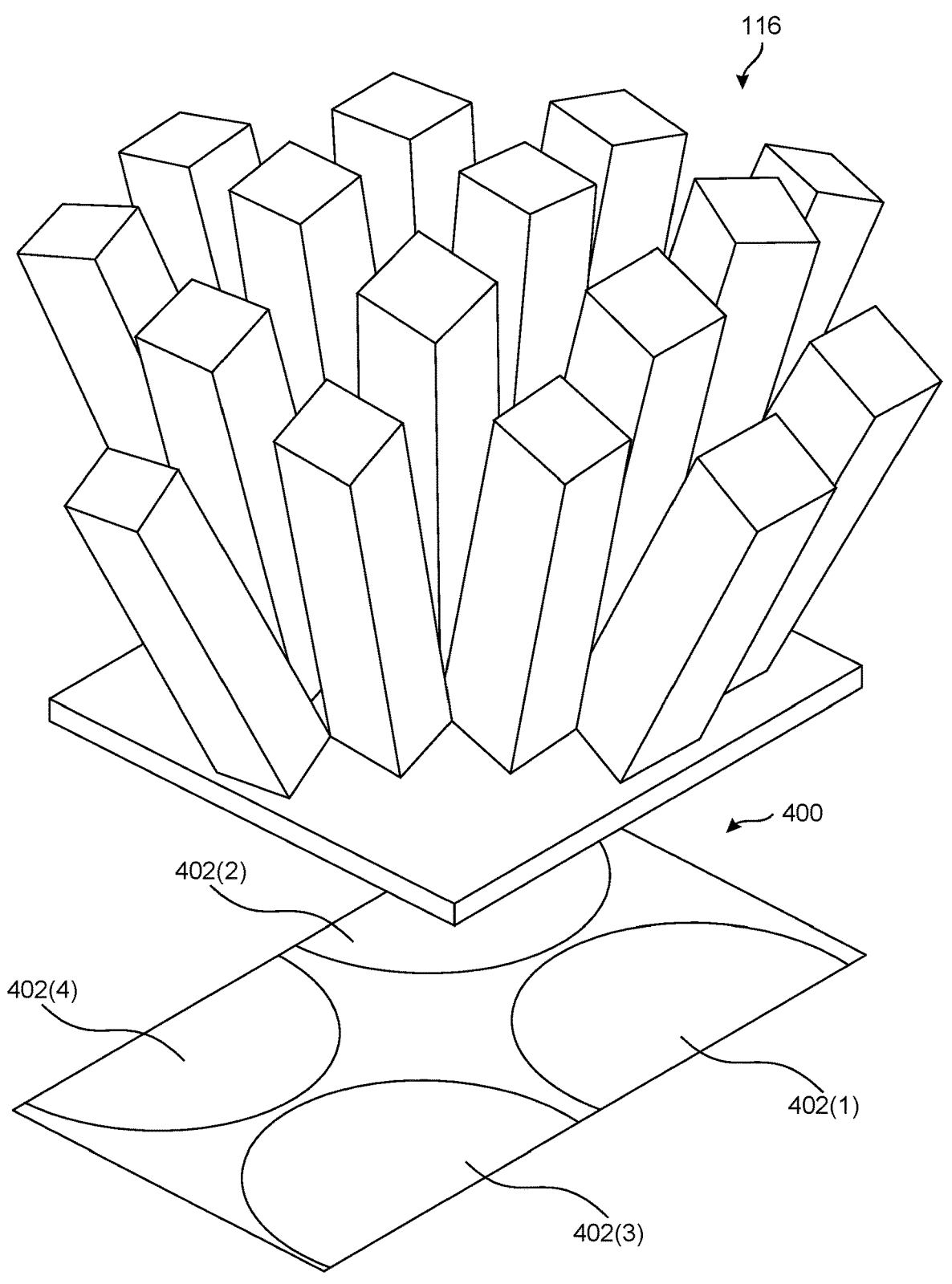
FIG. 4 illustrates an example build area associated with the lasing module of the 3D printing system of FIG. 1, according to an example of the present disclosure.

FIG. 4 illustrates an example build area 400 disposed beneath the optical modules 116 of the lasing module 102. The build area 400 is shown including a first portion 402(1), a second portion 402(2), a third portion 402(3), and a fourth portion 402(4). The first portion 402(1) may be associated with a first build module, the second portion 402(2) may be associated with a second build module, the third portion 402(3) may be associated with a third build module, and the fourth portion 402(4) may be associated with a fourth build module. The portions 402(1)-(4) may be sections of build areas associated with each of the build modules 104. For example, the first portion 402(1) may represent a portion of a build area of the first build module, where other portions of the build area of the first build module may not be within the build area of the lasing module 102 (e.g., out of view of the lasers). Stated alternatively, compared to FIG. 3 in which an entirety of the build area of the build modules 104 were visible to the lasing module 102, FIG. 4 illustrates that portions of build areas of the build modules 104 are outside of the build area 400. In some instances, the first build module and the second build module are disposed in a first lane of a conveyor system, whereas the third build module and the fourth build module are disposed in a second lane of the conveyor system. Multiple lanes may provide the build modules 104 to the lasing module 102.

The optical modules 116 are configured generate laser beams for manufacturing parts across the first portion 402(1), the second portion 402(2), the third portion 402(3), and the fourth portion 402(4). For example, compared to FIG. 3 in which parts are manufactured across two build modules, FIG. 4 illustrates that the lasing module 102 may manufacture parts across four build modules 104. As such, as the build modules 104 pass underneath the lasing module 102, the laser beams may be steered to manufacture parts across a plurality of the build modules 104, or to complete lasing tasks 126 across the build modules 104. Additionally, although FIG. 4 illustrates that the portions 402(1)-(4) are relatively similar in shape and size, it is to be understood that the differently shaped or sized portions may be within the build area 400. For example, depending upon the complexity of parts being manufactured, certain parts may be manufactured quicker than one other. In such instances, only one build module 104 may be disposed beneath the lasing module 102 in one lane, and one or two build modules 104 may be disposed beneath the lasing module in another lane. As such, the number of build modules 104, or build areas of the build modules 104, beneath the lasing module 102 may be different than shown in FIG. 4.

Figure 5:
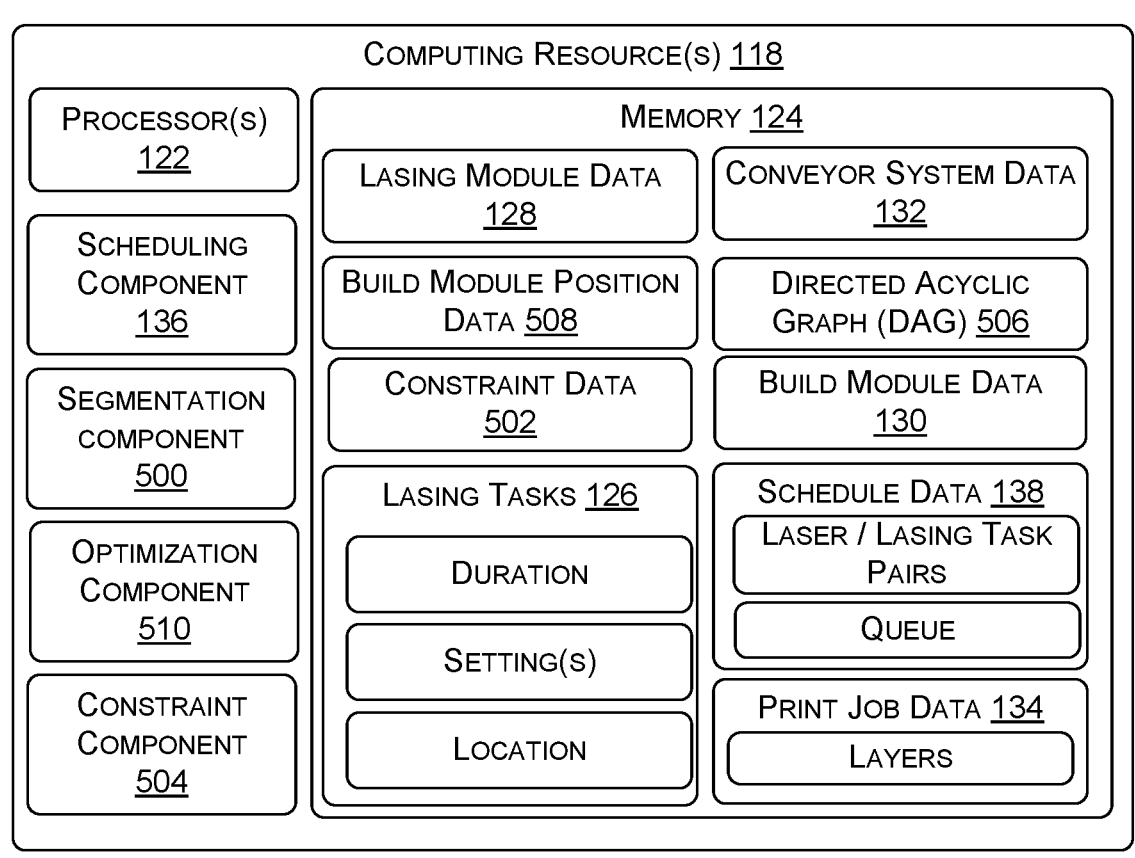
FIG. 5 illustrates example computing components of the computing resource(s) for manufacturing parts using the 3D printing system of FIG. 1, according to an example of the present disclosure.

FIG. 5 illustrates components of the computing resource(s) 118. As introduced above, the computing resource(s) 118 include the processor(s) 122 and the memory 124. The memory 124 stores or otherwise has access to the lasing module data 128, the build module data 130, the conveyor system data 132, and the print job data 134. The lasing module data 128 identifies the lasing modules 102, and the optical modules across the lasing modules 102, and may be used when communicating the schedules to the lasing modules 102, respectively. Additionally, the lasing module data 128 may be used to indicate or identify the lasers (or the optical modules 116) within the lasing modules 102, respectively. The lasing module data 128 may also indicate characteristics of the optical modules 116 associated with the lasing module 102, such as laser beam power, usage (e.g., availability), location, spot size, steering location, lens(es) and/or mirror(s) orientation, incident angles, and so forth. Such information may be used for knowing a state of the lasing modules 102. Additionally, as discussed herein, the lasing module data 128 may indicate the lasing tasks 126 of the lasing modules 102 (both scheduled and performed), for scheduling the lasing tasks 126.

The build module data 130 includes information associated with the build modules 104, such as a location of the build modules 104 within an environment, a part being manufactured within the build module 104, layers of parts being manufactured within the build module 104, a type of powdered material in the build module 104, a size of the build module 104 (or a container thereof), and so forth. Such information may be utilized when instructing the lasing modules 102 (and the optical modules 116 to manufacture certain parts), and/or the conveyor systems 108 to transport the build modules 104 to certain locations or lasing modules 102 within the environment. The build module data 130 may also be used to account for shifts in the build modules 104 as the build modules 104 traverse the environment and along the conveyor system 108 to accurately and precisely manufacture the parts and perform the lasing tasks 126.

The conveyor system data 132 includes information associated with the conveyor system 108. Such information, for example, may be used for routing build modules 104 to respective lasing modules 102 within the environment. The conveyor system data 132 indicates portions of the conveyor system 108 that route to respective lasing modules 102. The conveyor system data 132 may be used by the computing resource(s) 118 to communicate and instruct motors of the conveyor system 108 for maneuvering the build modules 104 to respective lasing modules 102.

The print job data 134 may correspond to parts that are to be built within the build modules 104. For example, the print job data 134 may indicate sides, surfaces, features, and so forth that make up or form the part. The print job data 134 may also indicate layers of the part that are to be manufactured for generating the part, where the layers (once manufactured) form the part. As shown, the print job data 134 may include layers that are determined, or are otherwise segmented from the part. In some instances, the layers may be generated or determined from a segmentation component 500. The layers may be generated, for example, from model(s) of the part and in accordance with certain thicknesses and/or areas. The segmentation component 500 may segment, discretize, or section the part into the layers for generating the print job data 134 used to manufacture the parts.

Furthermore, in some instances, the segmentation component 500 may determine the lasing tasks 126 that make up the layers of the part. For example, the lasing tasks 126 may be determined based on the geometry of the part. In some instances, the lasing tasks 126 may be associated with a maximum area to be manufactured on a layer. In this sense, the lasing tasks 126 may be limited to a certain size (or area) corresponding to the overall size of the layer. As an example, segmenting the layers into the lasing tasks 126 permits a plurality of lasers to manufacture the layer, or permits a plurality of lasers to be assigned to respective lasing tasks 126.

The lasing tasks 126 may be associated with a duration, location, and/or setting(s). The duration may be indicative of an amount of time to complete the lasing task 126, for a given laser. The location of the lasing task 126 may be indicative of a location of the lasing task on the layer. In some instances, the location may be expressed as coordinate positions (e.g., X and Y) on the layer. The location may also indicate bounds (e.g., perimeter, area, contour, etc.) of the lasing task 126. Additionally, the setting(s) may be indicative of the operational parameter(s) of the lasers to complete the lasing task 126. Such setting(s), for example, may indicate a steering of the mirror(s) of the lasing module 102, a spot size or focal length of the laser beams, whether lasers are to be clustered, and so forth. As will be discussed herein, the duration, location, and/or the setting(s) of the lasing tasks 126 may be used by the scheduling component 136 when scheduling the lasing tasks 126.

The memory 124 is further shown or having access to constraint data 502. The constraint data 502 may be generated by a constraint component 504 and represents constraints that are placed on the schedule of the lasing tasks 126. In some instances, the constrains may be input by a user interface, via an operator of the 3D printing system 100, for example. The constraint data 502 may be limitations placed on the order in which the lasing tasks 126 are scheduled. In some instances, the constrains are determined based at least in part on the duration, location, and/or setting(s) associated with the lasing tasks 126. The constraints may be determined for each part (or layer) to ensure a quality of the part. For example, certain lasing tasks 126 may be completed before other lasing tasks are scheduled. These constraints may represent predecessor/successor constraints that constrains a performance of certain lasing task 126 before a performance of another lasing task 126. In this example, a second lasing task may be completed (or scheduled) only after a first lasing task is completed. Such constraint, for example, may be based on a location of the first lasing task and the second lasing task which the layer. This type of conjunctive constraint limits certain lasing operations being performed before other lasing tasks are completed.

Additionally, certain lasing tasks 126 may not be performed at the same time as one another. For example, as the lasers melt the powdered metal, a plume of soot, debris, and gases may be generated. Here, lasing tasks 126 that are located within the plume may not be performed at the same time. Performing these lasing tasks 126 (i.e., the lasing tasks 126 that are within the plume) may degrade a quality of the part. As such, to reduce an impact of the plume on other lasing tasks 126, certain lasing tasks may not be scheduled to be perform simultaneously. This type of constraint, for example, may represent a disjunctive constraint that constrains tasks being performed simultaneously. For example, a lasing task located downstream of another lasing task may not be performed at the same time given the effects of the plume. In some instances, the affect of the plume may be based on a flow of gases (e.g., exhaust) within the lasing module 102 (e.g., processing chamber).

In some instances, the constraints determined by the constraint component 504 may ensure a quality of the manufactured part. However, the constraints may be lessened or relaxed in some instances to increase a speed of manufacturing. As such, for a given part, the constraints may be determined based upon characteristics desired of the part being manufactured. For example, to increase a speed of manufacturing the parts, a quality of the part may be adjusted. This may, for example, enable certain lasers that were once inadequate to perform the lasing tasks 126 being capable of performing such lasing tasks (e.g., high incident angles).

In some instances, the generated constraints may be used to generate a directed acyclic graph (DAG) 506 that is shown stored in the memory 124. The DAG 506 represents an order in which the lasing tasks 126 are performed and the constraints may represent edges in the DAG 506. For example, the DAG 506 will not violate constraints that are imposed in order to ensure part quality. After the constraints are determined for a particular layer, the DAG 506 is generated the DAG 506 is used to determine a proper order of the lasing tasks 126, in relation to one another, so as to not violate the determined constraints.

Additionally, given the location of the lasing task 126 on the layer and/or the location of build module 104 within the lasing module 102, certain lasing tasks 126 may not be capable of being performed until the build module 104 is further advanced into the lasing module 102. In this sense, certain lasing tasks 126 may be dependent upon the location of the build module 104 within the lasing module 102. That is, given the motion of the build module 104 within the lasing module 102, the motion may impact which lasing tasks 126 are performed before others. The position of the build module 104 may affect those lasers that are capable of performing the lasing task 126. To account for the movement and position of the build module 104, the memory 124 is shown storing build module position data 508. In essence, for a given position of the build module 104 within the lasing module 102, the lasing tasks 126 that are capable of being performed at the given position are determined. The constraints may additionally or alternatively, indicate that for a given position of the build module 104, which of the lasing tasks 126 are capable of being performed by the lasing module 102. In some instances, a list may be generated that indicates for the positions of the build module 104 throughout the lasing module 102, the lasers that are capable of performing the lasing tasks 126.

In addition to the position of the build module 104 affecting which lasers are capable of performing the lasing tasks 126, some lasing tasks 126 may be restricted from being performed by certain lasers given their angle of incidence. That is, the lasers may be oriented at respective incident angles to the build modules 104, and therefore, relative to certain lasing tasks 126. These incident angles, for example, if too severe, may impact a quality of the part. As such, based on the location of the lasing task 126 and/or the laser, certain lasers may be limited from performing certain lasing tasks 126.

The scheduling component 136 generates schedules for the lasers of the lasing modules 102. The scheduling component 136 may determine an optimal scheduling of lasers within a given build module 104. Additionally, the scheduling component 136 may determine an optimal scheduling of lasers across build modules 104, or multiple build modules 104 that are beneath a lasing module 102. In some instances, the scheduling component 136 may also determine an optimal scheduling of lasers across multiple lasing modules 102. In some instances, the scheduling component 136 may use the constraint data 502, the DAG 506, the build module position data 508, the lasing tasks 126, and/or other information to generate schedules. The schedules are stored as schedule data within the memory.

Generally, the schedule data 138 is associated with list of lasing tasks 126 that are to be performed by the lasers at a given instance or moment in time as the build module 104 passes through the lasing module 102. The scheduling component 136 schedules the lasing tasks 126 for manufacturing layers of the part, and the lasing tasks 126 are associated with a time at which the lasers perform the lasing tasks 126. The scheduling component 136 may utilize the constraints or other limitations for scheduling the lasing tasks 126. For example, as noted above and in reference to the DAG 506, certain lasing tasks 126 may be completed before other lasing tasks 126 are scheduled to be performed. Additionally, certain lasing tasks 126 may be restricted from being performed at the same time as other lasing tasks 126. These constraints, for example, may affect the order in which the lasing tasks 126 are scheduled. Additionally, given the position of the build module 104 (e.g., the build module position data 508), the position of the build module 104 may affect which lasing tasks 126 are scheduled.

In some instances, the scheduling component 136 determines pairs of laser and lasing task that are capable of being performed at a given position of the build module 104. For example, when the build module 104 is at a first position within the lasing module 102 a first laser may be capable of performing a first lasing task. At a second position of the build module 104, a second laser may be capable of performing the first lasing task. In some instances, the scheduling component 136 generates these pairs and stores them in the schedule data 138. Using the pairs, however, the scheduling component 136 may select an appropriate pair to perform the lasing task. For example, to ensure a quality of the part, certain lasers may be limited to performing certain lasing operations given their angle of incidence on the build module 104. Using the laser/lasing task pair, the scheduling component 136 selects a laser for performing the lasing task 126, and in turn, schedules the laser to perform the lasing task 126 at a given position of the build module 104. However, noted herein, the lasing module 102 may select the laser/lasing task pair based on conditions sensed within the environment.

As part of generating the schedule, the scheduling component 136 may also determine a queue for the lasers. The queue, for example, may represent a list of lasing tasks 126 that a particular laser is to perform. The laser may progress through the lasing tasks 126 within the queue to complete the lasing tasks 126 for a single build module 104 or across multiple build modules 104. For example, the laser may complete a first lasing task, a second lasing task, a third lasing task, and so on. The lasing tasks 126 may be within the same layer or across different layers. As the lasing tasks 126 are performed, data associated with the lasing tasks 126 may be recorded (e.g., time, spot size, temperature, etc.).

Lasers across lasing modules 102, such as different lasing modules 102 throughout a facility, may respectively have a schedule. As parts are manufactured, the lasers progress through respective schedules to perform their lasing tasks 126. Across a facility, any given number of lasers may be performing respective lasing tasks 126 for manufacturing any number of parts across the build modules 104. In doing so, the scheduling component 136 (or other components of the computing resource(s) 118) coordinates the scheduling of the lasing tasks 126 across the build modules 104 and the lasing modules 102 for manufacturing the parts. That is, although the above discussion is with regard to scheduling lasers within a single lasing module 102, the environment may include a plurality of lasing modules 102 that are configured to manufacture parts, layer by layer, across a plurality of build modules 104 and the scheduling component 136 may generate respective schedules for the parts being manufactured.

In some instances, the schedules are determined ahead of time and prior to manufacturing of the part. For example, the scheduling component 136 may determine the schedule and then transmit the schedules to the lasing module 102, the build modules 104, the conveyor system 108, and/or other components of the 3D printing system 100. The lasing module 102 may then perform the lasing tasks 126 in accordance with the schedule by instructing certain lasers to complete respective lasing tasks 126. For example, upon the build module 104 entering the lasing module 102, the build module 104 may be identified (e.g., via an identifier), and the lasing module 102 may identify the schedule for performing the lasing tasks 126 for the build module 104 (or the particular layer of the build module 104).

However, updates may be made to the schedules based on changing conditions. For example, delays may be introduced that affect downstream lasing tasks 126 being carried out by the lasing module 102. As another example, lasers may become unavailable at certain times (e.g., decommissioned, busy completing other lasing tasks, etc.). In such instances, theses changing conditions may impact future lasing tasks 126 that are to be carried out by the lasers. Here, the lasing module 102 may have access to the schedule data 138 to select other laser/lasing task pairs. For example, the lasing module 102 may select another laser to perform a given lasing task 126.

In some instances, the schedules may be transmitted to the conveyor system 108 such that the build modules 104 are conveyed along a certain trajectory relative to the lasing module 102. For example, given that the conveyor system 108 may move the build module 104, a given path or trajectory may be determined for the build module 104 relative to the lasing module 102. This path, for example, is in accordance with the determined schedule. Identifiers on the build module 104 may also be associated with the schedules such that as the build module 104 enters the lasing module 102, a given layer of the part is manufactured.

The lasing module 102 may monitor a performance or progress of the lasing tasks 126. If lasing tasks 126 become delayed or certain lasers that were previously scheduled to complete a lasing task 126 are offline (or unavailable), an updated schedule may be determined. The updated schedule, for example, may be based on the constraints as noted above, as well as lasers that are available. For example, the lasing module 102 may determine, based on the DAG and the location of the build module 104 relative to the lasing module 102, lasers that are capable of performing the lasing task 126. Therein, the lasing module 102 may schedule a laser for completing the lasing task 126. This process, however, may be continuous and constantly update based on the sensed conditions within the build module 104, an availability of lasers of the lasing module 102, and so forth.

In some instances, and as part of scheduling, the computing resource(s) 118 may optimize a use of the lasers and the time it takes to manufacture a part (or layers of a part). For example, the computing resource(s) 118 are shown including an optimization component 510 that determines an optimized use of the lasers across the lasing modules 102. The lasers may be assigned to the lasing tasks 126 to limit a downtime of the lasers. This may include, adjusting a position of the build module 104 relative to the lasing module 102, increasing a speed of the build module 104 within/through the lasing module 102, and so forth. Additionally, lasers may be scheduled in a way that optimizes the use of the lasers across lasing modules 102. That is, lasers from a single lasing module 102 may act on build areas across the build modules 104, and scheduled in a way that the lasers are efficiently used across the build modules 104. In this example, if lasers of a lasing module 102 are not being efficiently used, then lasing tasks 126 may be assigned to the lasing module 102 to optimize the use of the lasers.

Still, in some instances, the build modules 104 may be directed, via the conveyor system 108, to certain lasing modules 102 within an environment in a way that optimizes the lasers across lasing modules 102. Throughout an environment, for example, the build modules 104 may be transferred between the lasing modules 102, via the conveyor system 108, and lasers within the lasing modules 102, respectively. Here, the build modules 104 may be scheduled for certain lasing modules 102 in a manner that optimizes the use of the lasers across the build modules 104. In some instances, the schedules are optimized to maximize throughput through the lasing modules 102. In such optimization, the lasers may be scheduled with minimal downtime. However, the schedules may be optimized according to other variables, such as quality or cost.

Although certain components of the remote resource(s) 118 are shown, the remote resource(s) 118 may include additional or alternative component(s) other than those described. Moreover, the lasing module 102 and/or other system in the environment may have components similar to those of the remote resource(s) 118, or have access to the data stored by the remote resource(s) 118.

FIG. 6 illustrates computing components of lasing modules 600 and conveyor systems 602. FIG. 6 illustrates the computing resource(s) 118 in communication with lasing modules 600(1)-(N), such as a first lasing module 600(1) up to an nth lasing modules 600(N), and conveyor systems 602(1)-(N), such as a first conveyor system 602(1) up to an nth conveyor system 602(N). The lasing modules 600(1)- (N) may be similar to the lasing module 102 discussed above, and the conveyor systems 602(1)-(N) may be similar to the conveyor system 108 discussed above.

The computing resource(s) 118 communicatively couple to the lasing modules 600(1)-(N), the conveyor systems 602(1)-(N), or other devices for at least partially controlling an operation of the 3D printing system 100. The computing resource(s) 118 may transmit the schedule data 138 to the lasing modules 600(1)-(N). However, the computing resource(s) 118 may communicatively couple to other components, or devices, not shown. For example, the computing resource(s) 118 may be communicatively coupled to recoaters that apply coats of powdered material to the build modules 104, respectively.

Each of the lasing modules 600(1)-(N) may include processor(s) and memory. The first lasing module 600(1) is shown including first processor(s) 604(1) and first memory 606(1), and the nth lasing module 600(N) is shown including nth processor(s) 604(N) and nth memory 606(N). The processor(s) 604(1)-(N) may perform various functions and operations associated with controlling the laser(s), imaging sensor(s), mirror(s), lens(es), etc. of lasing modules 600(1)- (N), respectively, and the memory 606(1)-(N) may store instructions executable by the processor(s) 604(1)-(N) to perform the operations described herein. For example, the processor(s) 604(1)-(N) may receive instructions from the computing resource(s) 118 associated with the schedules and manufacturing parts, and the processor(s) 604(1)-(N) may control components of the lasing modules 600(1)-(N), respectively, to carry out those instructions.

The memory 606(1)-(N) is respectively shown storing schedule data 612(1)-(N), which may be similar to the schedule data 138 discussed above. The schedule data 612(1)-(N) may be generated by the scheduling component

136 of the computing resource(s) 118 and transmitted to the lasing modules 600(1)-(N) for performance. Each of the schedule data 612(1)-(N) indicates lasing tasks 608(1)-(N) that are to be respectively performed by lasers 610(1)-(N) of the lasing modules 600(1)-(N). For example, responsive to receiving the schedule data 612(1)-(N), the lasers 610(1)-(N) of the lasing modules 600(1)-(N) may carry out the lasing tasks 608(1)-(N). The lasing tasks 608(1)-(N) may be stored or otherwise indicated in queues associated with each of the lasers 610(1)-(N). That is, for a given laser of the lasing modules 600(1)-(N), the lasers 610(1)-(N) may have a respective queue of lasing tasks 608(1)-(N) to be performed. Noted above, the lasing tasks 608(1)-(N) may be performed in a certain order as determined by the scheduling component 136 of the computing resource(s) 118 (e.g., in the DAG 506).

The memory 606(1)-(N) may also respectively store the setting(s) 614(1)-(N) that correspond to parameters of the lasing modules 600(1)-(N). For example, the setting(s) 614 (1)-(N) may include beam powers, steering directions, beam path length, and so forth. The setting(s) 614(1)-(N) may be adjusted or carried out in accordance with instructions associated with the schedule data 612(1)-(N) or the lasing tasks 608(1)-(N). The memory 606(1)-(N) is further shown storing sensor data 616(1)-(N) that corresponds to data generated by respective sensor(s) 618(1)-(N) of the lasing modules 600(1)-(N). In some instances, the sensor(s) 618 (1)-(N) may include imaging sensor(s), such as cameras, laser range finders that image (e.g., sense) the build modules 104, laser displacement sensor(s) that image (e.g., sense) the build modules 104, optical encoder(s) (e.g., linear optical encoder(s)), computer vision sensor(s), and so forth. For example, as the build modules 104 are transported on the conveyor systems 602(1)-(N), respectively, the sensor(s) 618(1)-(N) may image the build modules 104. The sensor data 616(1)-(N) is utilized for determining a velocity, position, distance to, and/or orientation of the build modules 104 relative to the lasing modules 600(1)-(N), respectively, for use in controlling the lasing modules 600(1)-(N). For example, depending on the position of the build modules 104, the mirror(s) and/or lens(es) may be controlled to adjust a steering or spot size of the laser beams. Such adjustments ensure the accurate and precise manufacturing of parts. In some instances, the sensor data 616(1)-(N) may be provided to the computing resource(s) 118, such as the scheduling component 136, for providing instructions back to the lasing modules 600(1)-(N) to control an operation thereof. Additionally, the sensor data 616(1)-(N) may be used to update the schedules based on the lasers 610(1)-(N) paired with the lasing tasks 608(1)-(N).

For example, in some instances, the sensor data 616(1)- (N) is used to adjust the schedules of the lasing modules 600(1)-(N) or the lasing tasks 608(1)-(N) performed by the lasers 610(1)-(N) of the lasing modules 600(1)-(N). The schedules may be updated based on a progress of the lasing tasks 608(1)-(N) being performed or unexpected delays (e.g., damaged lasing modules 600(1)-(N), damaged laser(s) 610(1)-(N), and so forth). That is, lasing tasks 608(1)-(N) that were previously assigned to certain laser(s) 610(1)-(N) may be reassigned to other laser(s) 610(1)-(N). As part of this, the lasing modules 600(1)-(N) may track a performance of the lasing tasks 608(1)-(N), and based on such performance, may reschedule some of the lasing tasks 608(1)-(N) to other laser(s) 610(1)-(N). To reschedule, the lasing modules 600(1)-(N) may include scheduling components 620 (1)-(N), respectively. The scheduling components 620(1)- (N) may be similar to the scheduling component 136 of the computing resource(s) 118. The scheduling components 620(1)-(N) may also have access to the DAG 506 for knowing the constraints.

In some instances, the lasing modules 600(1)-(N) may include controllers 622(1)-(N) that cause the lasing modules 600(1)-(N) to control the laser(s) 610(1)-(N), sensor(s), mirror(s), lens(es), etc. of the lasing modules 600(1)-(N). For example, the first lasing module 600(1) may include a first controller 622(1) and the nth lasing module 600(N) may include an nth controller 622(N). Each of the controllers 622(1)-(N) is responsive to instructions from the computing resource(s) 118, such as the scheduling component 136, or may be independently operable to cause the lasing modules 600(1)-(N) to perform certain operations. In some instances, for example, the controllers 622(1)-(N) may actuate galvo mirrors based on a receiving instructions as to a melting location within/on the build area of the build modules 104. The controllers 622(1)-(N) may respectively utilize the setting(s) 614(1)-(N) for controlling an operation of the lasing modules 600(1)-(N).

The conveyor systems 602(1)-(N) are shown including respective processor(s) 626(1)-(N) and memory 628(1)-(N), where the processor(s) 626(1)-(N) may perform various functions and operations associated with controlling conveyor system 602(1)-(N) and the memory 628(1)-(N) may store instructions executable by the processor(s) 626(1)-(N) to perform the operations described herein. The memory 628(1)-(N) is shown respectively storing setting(s) 630(1)- (N) associated with an operation of the conveyor systems 602(1)-(N). For example, the setting(s) 630(1)-(N) may include a speed of motors, rotators, and so forth of the conveyor systems 602(1)-(N). Such information may be used to control respective motor(s) 632(1)-(N) of the conveyor systems 602(1)-(N) for directing the build modules 104 about an environment and/or to certain lasing modules 600(1)-(N) in the environment. In some instances, the scheduling component 136 may instruct the conveyor systems 602(1)-(N) as to how to transport the build modules 104 about the environment (e.g., speed, location, etc.). Moreover, the conveyor systems 602(1)-(N) may respectively include controller(s) 634(1)-(N) that are responsive to the instructions, and which carry out operation of the conveyor systems 602(1)-(N).

The processor(s) 604(1)-(N) of the lasing modules 600 (1)-(N) and the processor(s) 626(1)-(N) of the conveyor systems 602(1)-(N) may be similar to the processor(s) 122 as discussed above. Additionally, the memory 606(1)-(N) of the lasing modules 600(1)-(N) and the memory 628(1)-(N) of the conveyor systems 602(1)-(N) may be similar to the memory 124 as discussed above.

Figure 7:
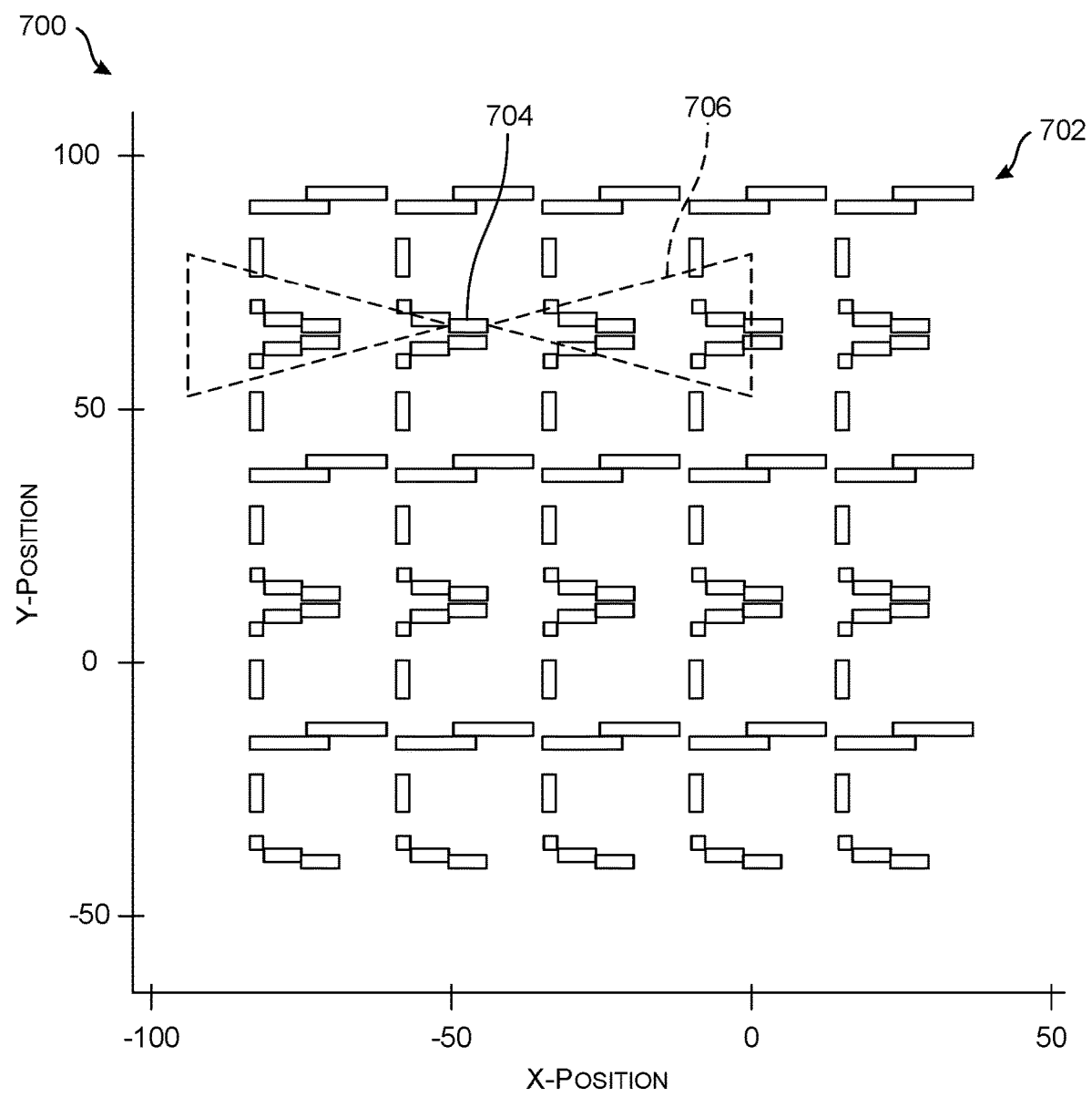
FIG. 7 is a diagram showing an example region of interest associated a lasing task for use in scheduling lasing tasks for one or more 3D printing systems, according to an example of the present disclosure.

FIG. 7 illustrates an example build area 700, showing a layer of part having a plurality of lasing tasks 702 (e.g., the lasing tasks 126). The lasing tasks 702 are illustrated as boxes (e.g., square, rectangular, etc.) within/on the build area 700. However, the lasing tasks 702 may be associated with other shapes. As discussed above, each of the lasing tasks 702 represents an area of the layer in which powdered metal is melted. For each of the lasing tasks 702, lasers beams from one or more lasers of the lasing module 102 may be scheduled to perform the lasing tasks 702. The build area 700 is represented with coordinates (X-position and Y-position), and lasing tasks 702 may correspondingly be associated with respective coordinates within/on the build area 700.

As part of determining the constraints for the lasing tasks 702, the scheduling component 136 may utilize the location of the lasing tasks 702 within/on the build area 700. For example, in FIG. 7, the scheduling component 136 may determine constraints for a particular lasing task 704. As part of determining the constraints, the scheduling component 136 may determine a region of influence 706 associated with the particular lasing task 704. In some instances, the region of influence 706 may be associated with a plume of debris, soot, and gases created while the particular lasing task 704 is being performed. That is, while the particular lasing task 704 is being carried out, other lasing tasks 702 within the region of influence 706 may be affected. The size, shape, or direction of the region of influence 706 may be based on a direction of movement of the build module, an intensity of the laser beam (e.g., spot size), the laser being evaluated for performing the particular lasing task 704, a flow of gases (e.g., vent/exhaust fan) across the build area (e.g., within the processing chamber), a direction of growth of the metal surface relative to the lasing module 120, and so forth.

In some instances, the other lasing tasks 702 within (whether completely or partially) the region of influence 706 may constrained from being performed while the particular lasing task 704 is being performed. That is, because of the off-gases, debris, and soot being created, the lasing tasks 702 that are located within the region of influence 706 may not be performed simultaneously as the particular lasing task 704 given the affects of the gases, debris, and soot on the quality of the part. These types of constraints may be considered disjunctive constraints due to the fact that other lasing tasks 702 are within the region of influence 706. Comparatively, lasing tasks 702 that are located outside the region of influence 706 may not be constrained relative to the particular lasing task 704. As such, these other lasing tasks 702 may be performed simultaneously with the particular lasing task 704. For example, while a first laser is scheduled for the particular lasing task 704, a second laser may be scheduled for a lasing task outside of the region of influence 706. This other lasing task may be performed simultaneously with the particular lasing task 704 given its location outside of the region of influence 706. Other constraints may be represented as well when scheduling the lasing tasks 702. Any number of lasing tasks 702 may be carried out, and more than one region of influence 706 may be associated with the layer at a given time given that multiple lasing tasks 702 may be carried out simultaneously.

Figure 8:
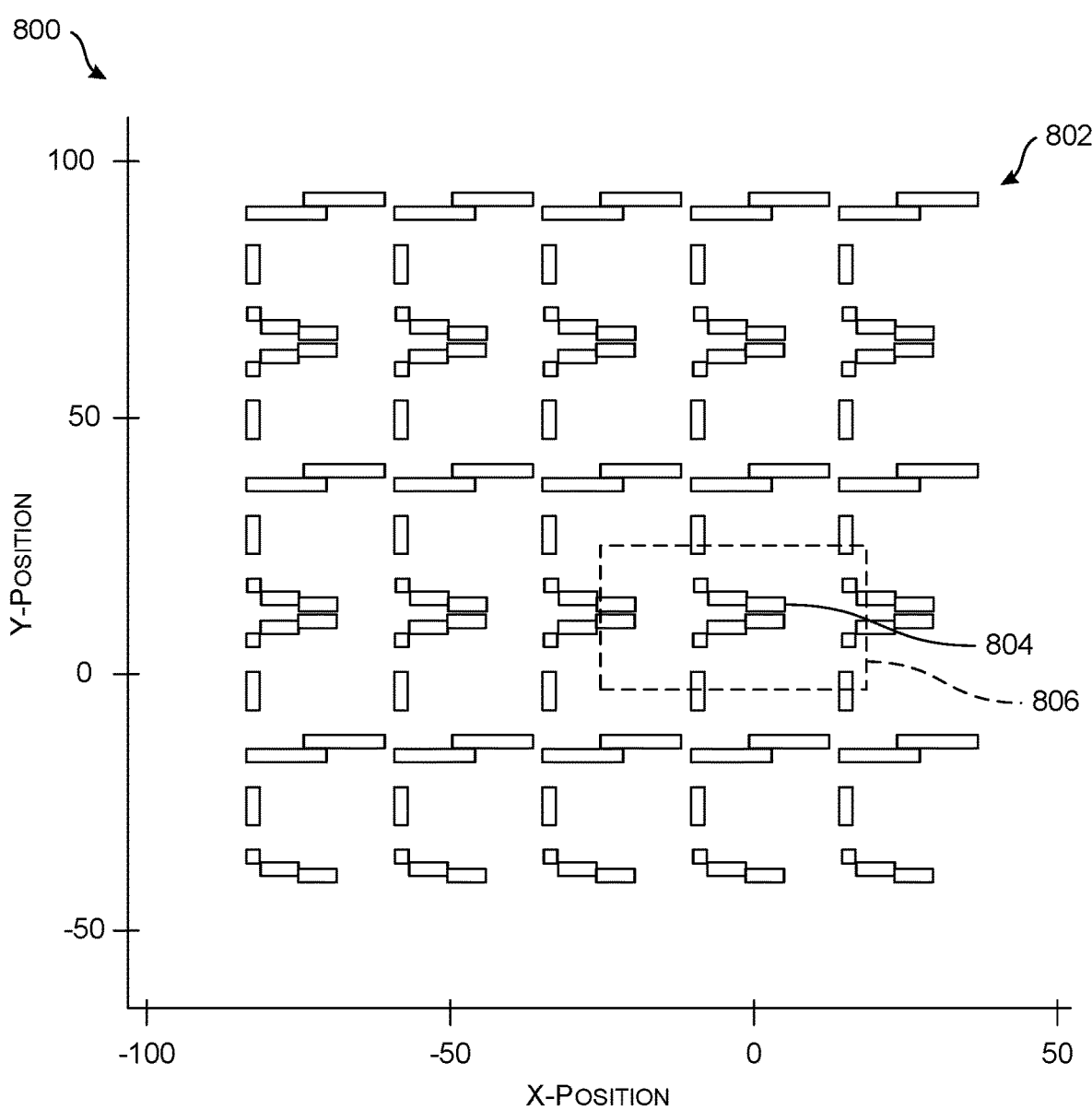
FIG. 8 is diagram showing an example region of interest associated with a lasing task, according to an example of the present disclosure.

FIG. 8 illustrates an example build area 800, showing a layer of part having a plurality of lasing tasks 802 (e.g., the lasing tasks 126). The lasing tasks 802 are illustrated as boxes (e.g., square, rectangular, etc.) within/on the build area 800. However, the lasing tasks 802 may be associated with other shapes. As discussed above, each of the lasing tasks 802 represents an area of the layer in which powdered metal is melted. For each of the lasing tasks 802, lasers beams from one or more lasers may be scheduled to perform the lasing tasks 802. The build area 800 is represented with coordinates (X-position and Y-position), and lasing tasks 802 may correspondingly be associated with respective coordinates within/on the build area 800.

As part of determining the constraints for the lasing tasks 802, the scheduling component 136 may utilize the location of the lasing tasks 802 within/on the build area 800. For example, in FIG. 8, the scheduling component 136 may determine constraints for a particular lasing task 804. As part of determining the constraints, the scheduling component 136 may determine a region of influence 806 associated with the particular lasing task 804. The region of influence 806 may be defined, or extend, certain distances from the particular lasing task 804 based on a size of the particular lasing task 804 and/or characteristics of the particular lasing task 804. While the particular lasing task 804 is being carried out, other lasing tasks 802 within the region of influence 806 may be affected.

For example, the particular lasing task 804 may be associated with a given lasing power (or intensity) to melt the powdered metal. This lasing power may be greater than the lasing power required to melt the powdered metal within the other lasing tasks 802 in the region of influence 806. The lasing tasks within the region of influence 806 may have predecessor/successor constraints given that the lasing tasks 802 are located within the region of influence 806 and/or based on characteristics of the particular lasing task 804 (e.g., laser intensity, part geometry, heat, etc.). For example, lasing tasks 802 that require more lasing power than other may be scheduled to go first, before other lasing tasks having less lasing power or for other process constraints to ensure a quality of the part. In such instances, the other lasing tasks 802 within the region of influence 806 may constrained from being performed until the particular lasing task 804 is performed. For example, while a first laser is scheduled for the particular lasing task 804, a second laser may be scheduled for a lasing task after the particular lasing task 804 is performed. That lasing task may be schedule for the first laser or the second laser. This other lasing task may be performed after with the particular lasing task 804 given its location within the region of influence 806. Additionally, the particular lasing task 804 may have an additional region of influence that is representative of a plume of soot or debris generated which performing the lasing task 802. Other lasing tasks 802 within this region of influence may not be performed simultaneously with the particular lasing task 804.

Figure 9:
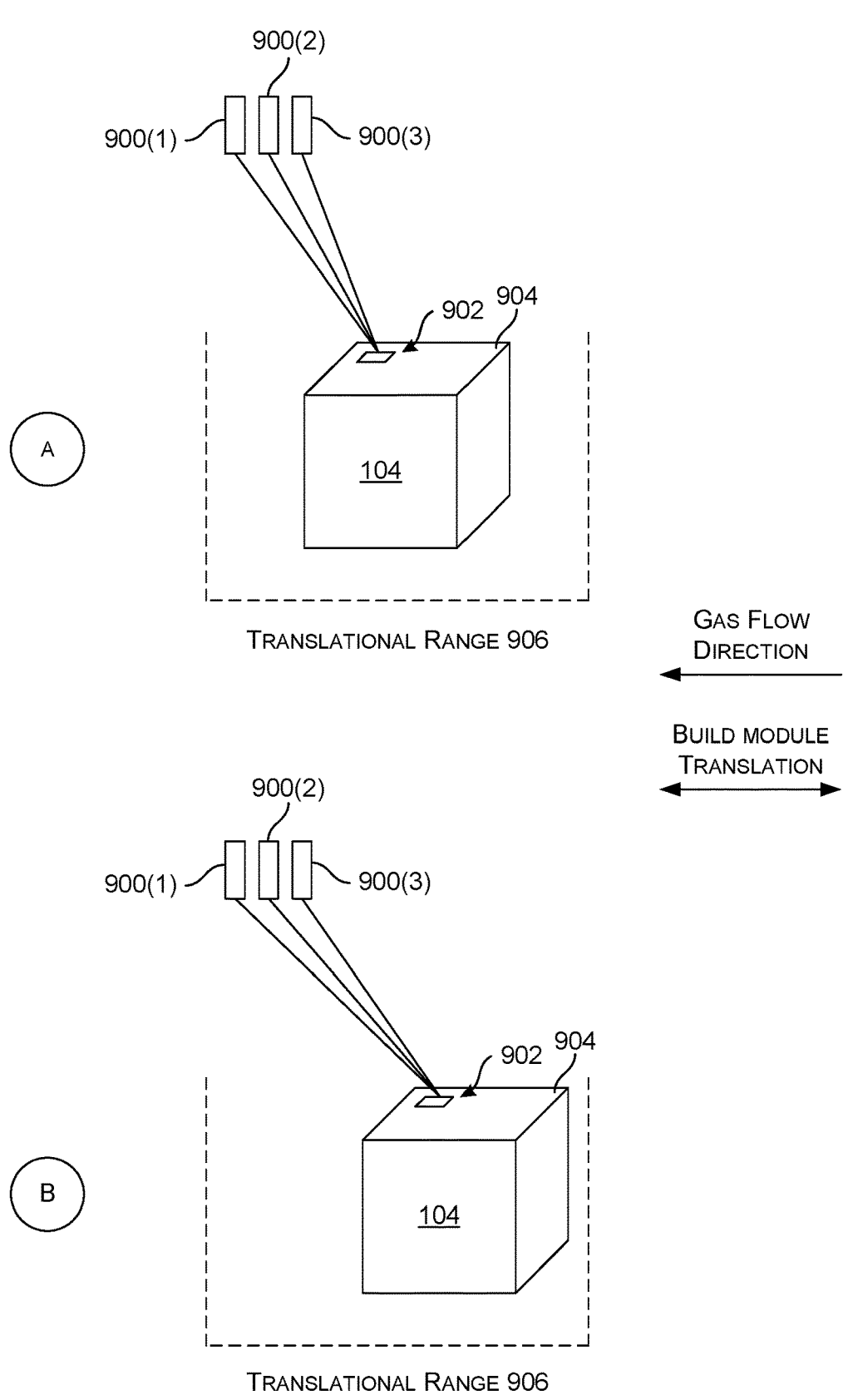
FIG. 9 is a diagram showing an example translational range of a build module relative to a lasing module for use in scheduling lasing tasks for one or more 3D printing systems, according to an example of the present disclosure.

FIG. 9 illustrates an example illustration showing different positions of the build module 104. For example, at "A" the build module 104 may be a first position relative to lasers 900(1)-(3) of the lasing module 102, and at "B" the build module 104 may be at a second position relative to the lasers 900(1)-(3).

A lasing task 902 is shown on a build area 904 of the build module 104. In evaluating the lasing task 902, such as which of the lasers 900(1)-(3) is to perform the lasing task 902 or which lasers 900(1)-(3) are capable of performing the lasing task 902, options may be generated that indicate a pairing of the lasers 900(1)-(3) to the lasing task 902. For example, as shown in FIG. 9, the build module 104 may be translated along a translational range 906 relative to a direction of travel of the build module 104 through the lasing module 102. Within, along, or over the translational range 906, the lasers 900(1)-(3) may be capable of performing the lasing task 902. However, at the first position and the second position, for example, each of the lasers 900(1)-(3) have different parameters. For example, as shown, each of the lasers 900(1)-(3) may have a respective laser beam, and the laser beams may have a respective angle of incidence on the build area 904. This consideration, as well as a direction of gas flow through the processing chamber, may impact the quality of the part and therefore, be used to determine a pairing of the lasers 900(1)-(3) to the lasing task 902.

In other words, as the build module 104 progresses through the translational range 906, a list of lasers that are capable of carrying out the lasing task 902 is generated. This list, for example, is based on the position of the build module 104 along the translational range 906. For example, at the first position in "A", the lasers 900 may have respective incident angles with the build area 904, and at the second position in "B" the lasers have may respective incident angles with the build area 904. In some instances, to ensure part quality, the incident angles may have minimum and/or maximum thresholds relative to the build area 904, the gas flow direction, and/or a material growth direction (e.g., the material being melted). In generating the list of lasers capable of performing the lasing task 902 at various positions, the scheduling component 136 may utilize the list to constrain which lasers are scheduled for the lasing task 902 (e.g., minimum and maximum angles). For example, the scheduling component 136 may pick from these options to optimize throughput and speed of execution given the availability of the lasers.

Although FIG. 9 illustrates three lasers or two positions of the build module 104, it is to be understood that more than three lasers may be evaluated for performing the lasing task 902, at more than two positions of the build module 104. As such, by adding motion of the build module 104 relative to the lasers 900(1)-(3), an extra degree of freedom is introduced to optimize part quality and throughput. That is, a laser that may not meet constraints while the build module 104 is at one location may meet those constraints later or earlier with translation of the build module 104. Motion of the build module 104, along the translational range 906, permits additional lasers to become available at different locations on the build module 104, increasing a parallelism of lasing tasks to be performed. Moreover, each of the lasers 900(1)-(3) may be capable of performing different lasing tasks within the build module 104, and the schedule may be generated in a way that optimizes the lasing tasks being performed by the lasers 900(1)-(3)

Figure 10A:
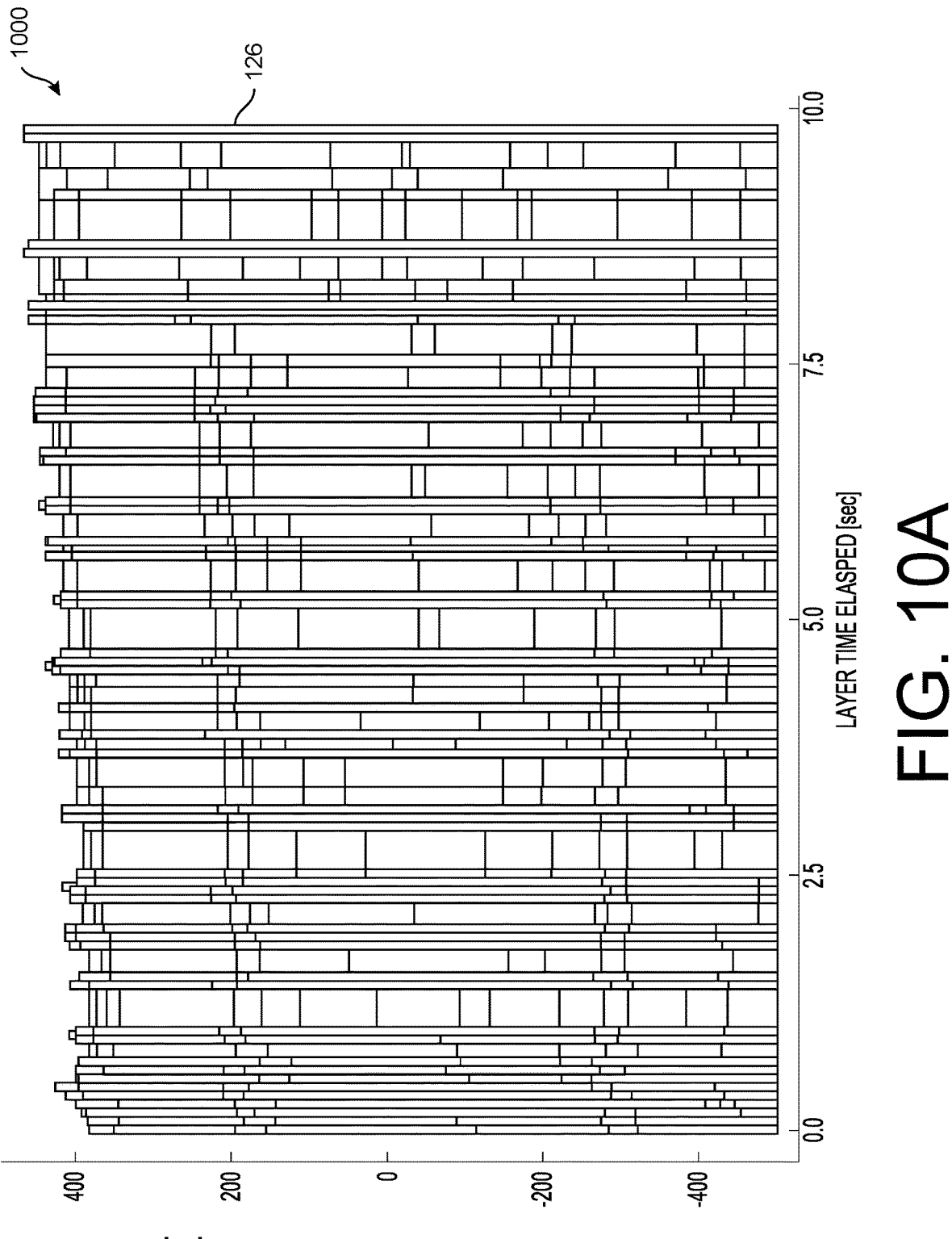
FIGS. 10A-10C are graphs showing example combinations of lasers and lasing tasks, as well as dynamically scheduling the lasing tasks for one or more 3D printing systems, according to an example of the present disclosure.
Figure 10B:
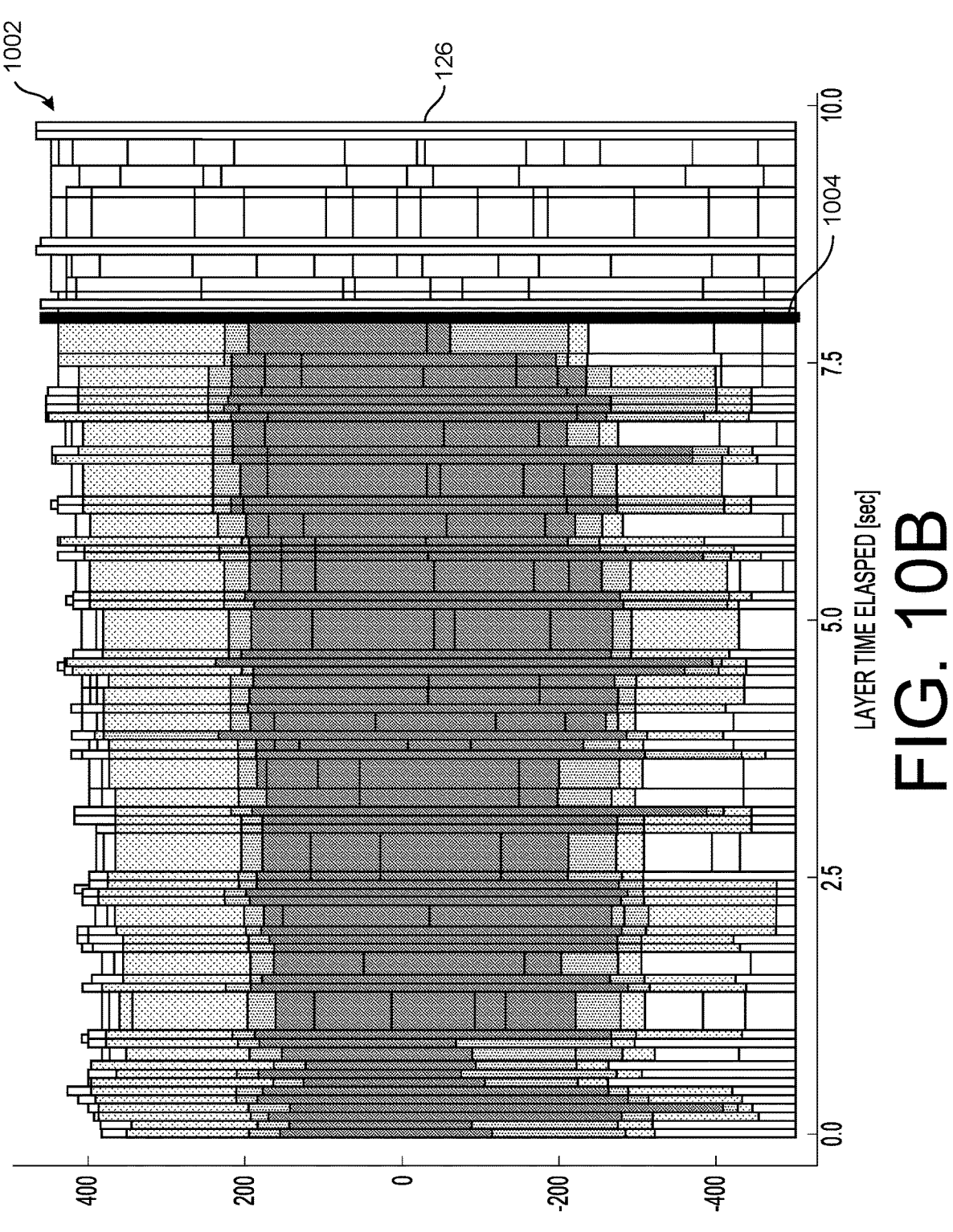
Figure 10C:
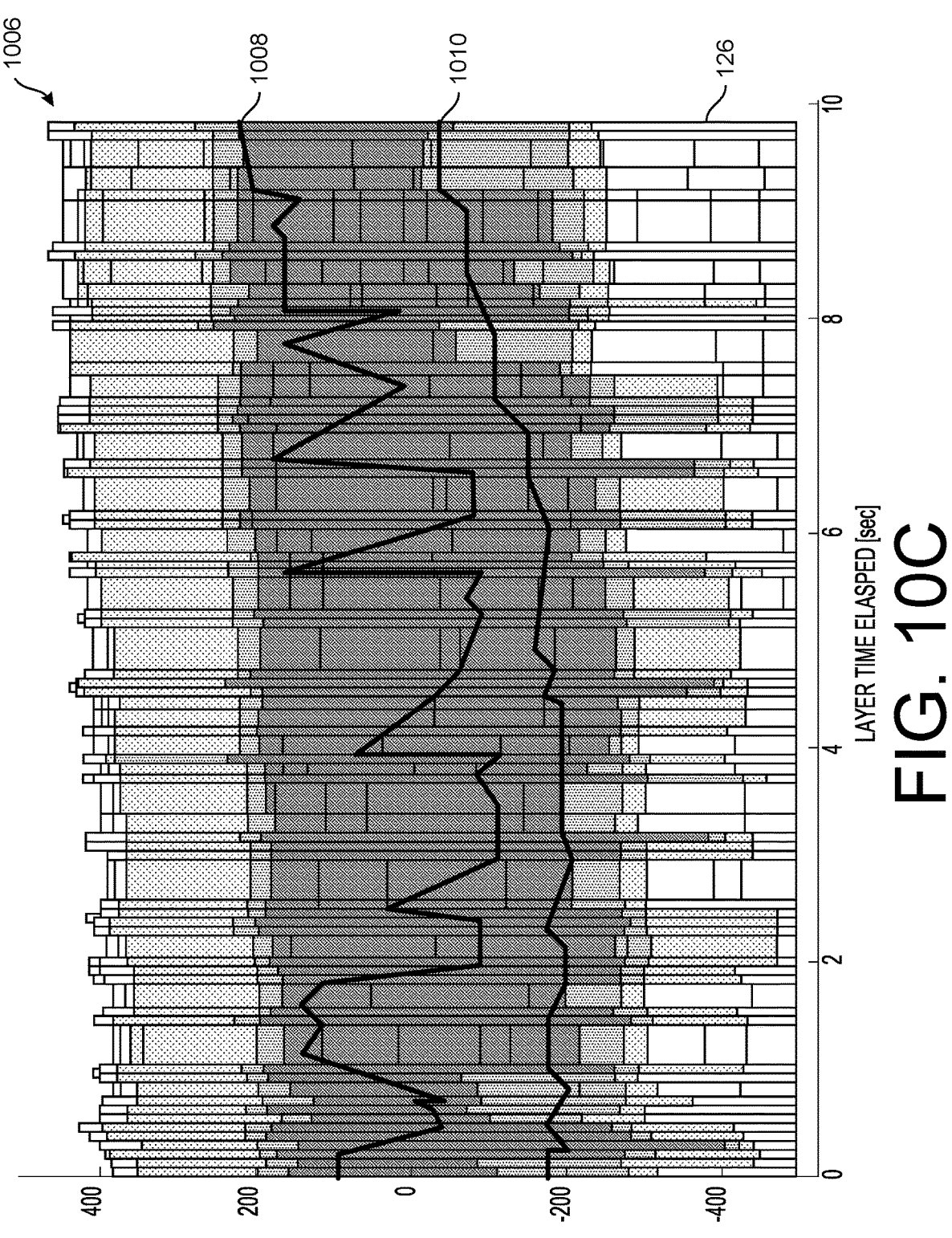

FIGS. 10A-10C illustrate example graphs for generating schedules. In FIG. 10A, a first graph 1000 is shown having a plurality of scheduled lasing tasks 126. Each of the lasing tasks 126 are shown as outlines, which represents overlapping various options of lasing tasks 126 and laser assignments. That is, for a given lasing task 126, there may be a plurality of lasers that are capable of performing the lasing task 126. The X-axis of the first graph 1000 illustrates that the lasing tasks 126 are located close together in time for maximum speed of execution. The Y-Axis of the first graph 1000 illustrates the different options that may occur at different build module positions to meet the constraints. As such, the first graph 1000 may represent a list of total space available to schedule the lasing tasks 126.

In FIG. 10B, a second graph 1002 is shown indicating a subset of the available options for the lasing tasks 126 and laser pairs. In the second graph 1002, the white boxes are the possible lasing task 126 and laser pairings and their outlines in both space (Y-axis) and time (X-axis). The green boxes are the subset of lasing tasks 126 and laser assignments that were executed. This subset is selected in order to maximize the throughput of the system by choosing options from all the possibilities which minimize the total execution time of all tasks in the layer while still respecting spatial and temporal constraints. The subset may be determined ahead of time and prior to being transmitted to the lasing module 102 (e.g., via the computing resource(s) 118). However, the second graph 1002 illustrates a current point in time 1004. Lasing tasks 126 to the left of the point in time 1004 have already been performed, whereas lasing tasks 126 to the right of the point in time 1004 have yet to be performed. At the lasing module 102, the laser and lasing task pairs may be scheduled within a certain threshold amount of time of the current point in time (e.g., milliseconds). By scheduling in this manner, the lasing module 102 may adapt to changing conditions on the fly, such as an availability of lasers or delays in previous lasing tasks 126.

In FIG. 10C, a third graph 1006 illustrates a first line 1008 and a second line 1010 are shown that represent lasing tasks 126 capable of being performed simultaneously. For example, an envelope of the first line 1008 and the second line 1010 may represent a region where all simultaneous lasing tasks 126 can be performed. This may indicate a proscribed allowable path of the build module 104 that corresponds to a schedule. In some instances, the build module path may be computed dynamically by the lasing module as the schedule is being fixed in real-time.

Figure 11A:
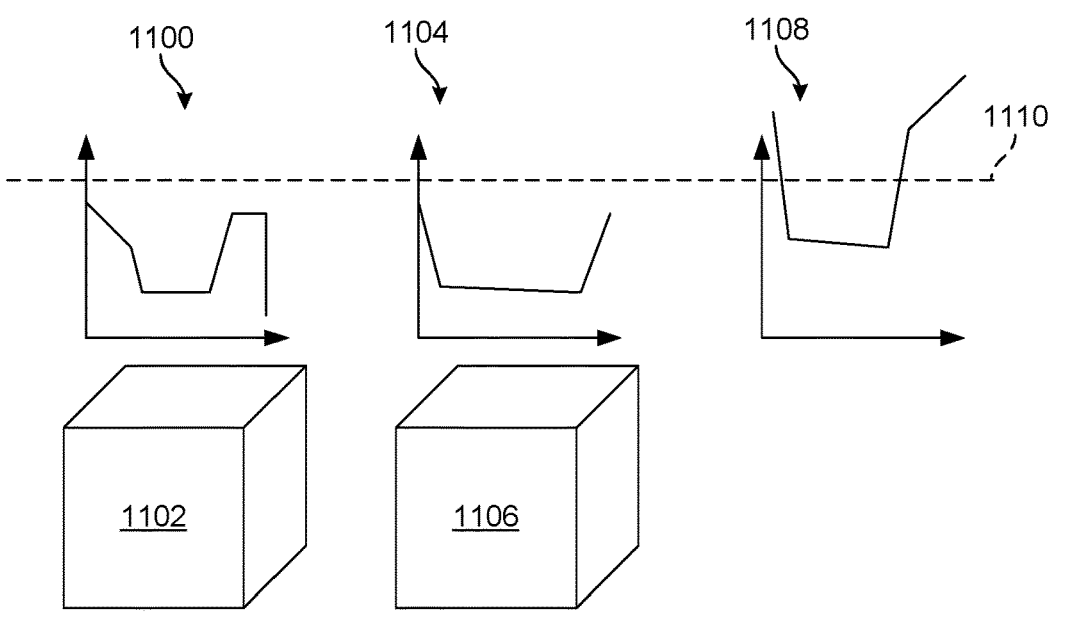
FIGS. 11A and 11B are diagrams illustrating example techniques for optimizing a utilization of lasers for one or more 3D printing systems, according to an example of the present disclosure.
Figure 11B:
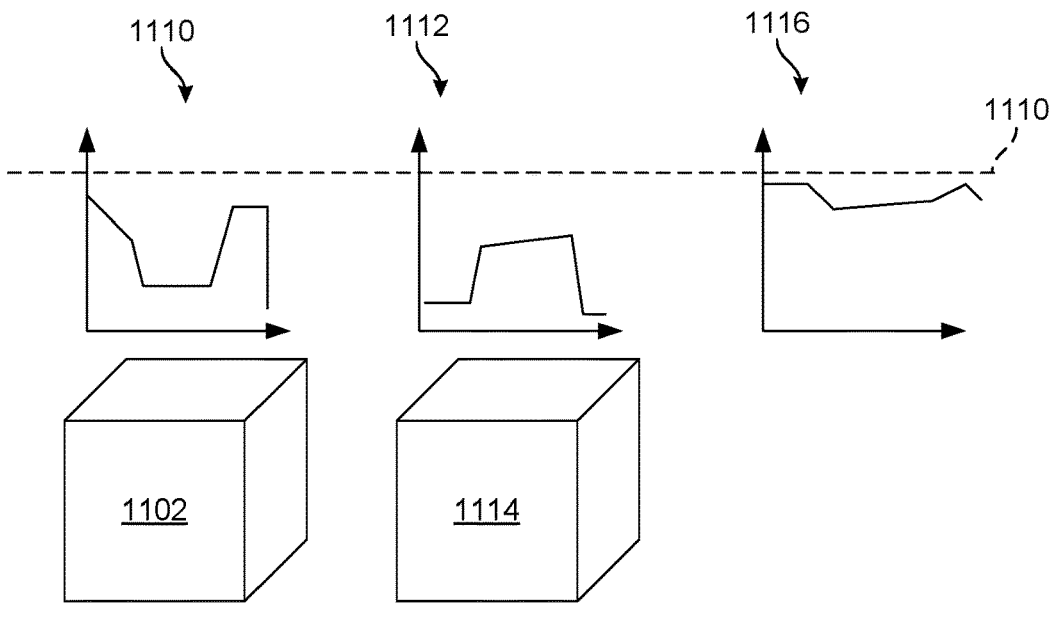

FIGS. 11A and 11B illustrate an example for optimizing a use of lasers when manufacturing parts across build modules 104.

In FIG. 11A a first graph 1100 is shown that illustrates a utilization of lasers, over time, for manufacturing a layer of a part within/on a first build module 1102. Additionally, a second graph 1104 is shown that illustrates a utilization of lasers, over time, for manufacturing a layer of a part within/ on a second build module 1106. As shown in the first graph 1100, the lasers may not be optimally utilized and as such, the first build module 1102 may be paired or match with a complimentary build module. To determine a complimentary build module, the utilization of the lasers to manufacture the layer of the part in the first build module 1102 may be added to the utilization of the lasers to manufacture the layer of the part in the second build module 1106. For example, a third graph 1108 illustrates the combined utilization. However, as also shown across the first graph 1100, the second graph 1104, and the third graph 1108, there may be a maximum utilization 1110. As shown, in the third graph 1108, the utilization of the lasers extends beyond the maximum utilization 1110. As such, the first build module 1102 and the second build module 1106 may not be suitable or compatible as a pair. For example, a lasing module may not have resources (e.g., the lasers) required to process both the first build module 1102 and the second build module 1106 simultaneously.

Instead, in FIG. 11B a fourth graph 1112 is shown that illustrates a utilization of lasers, over time, for manufacturing a layer of a part within/on a third build module 1114. The first graph 1100 and the fourth graph 1112 may be combined to generate a fifth graph 1116 that illustrates the combined utilization. As shown, in the fifth graph 1116, the utilization of the lasers does not exceed the maximum utilization 1110. As such, the first build module 1102 and the third build module 1114 may be suitable as being processed simultaneously within a lasing module.

Figure 12:
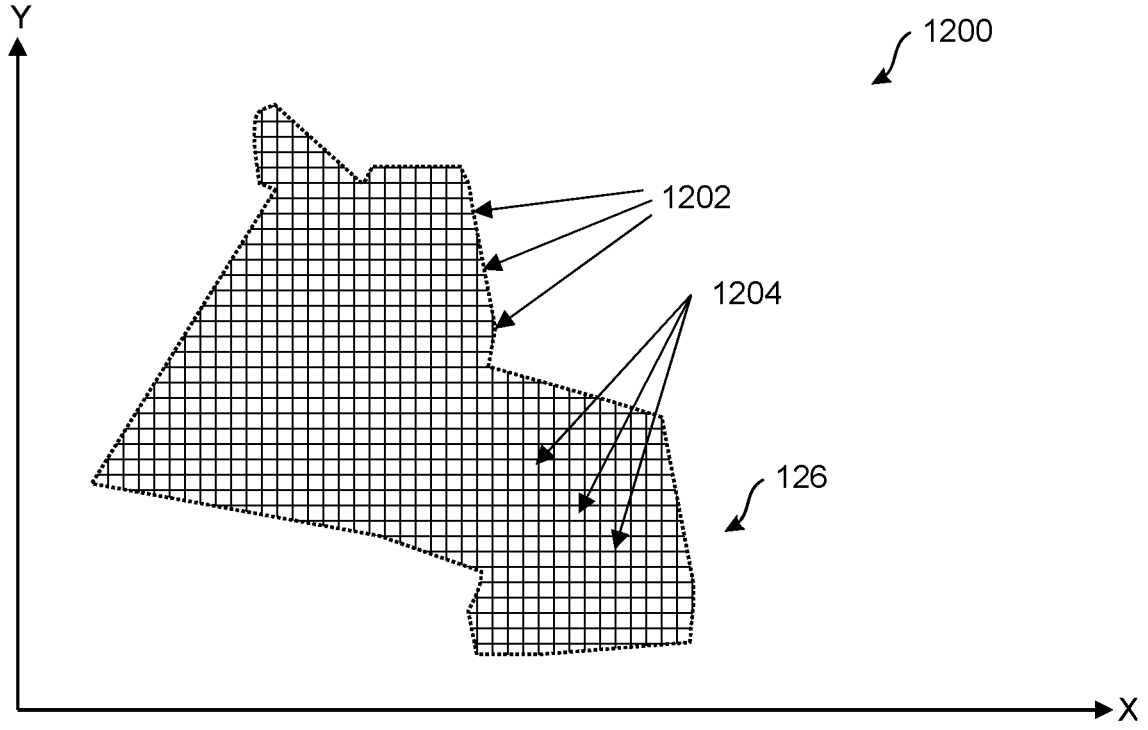
FIG. 12 illustrates example lasing tasks for manufacturing a layer of a part, according to an example of the present disclosure.

FIG. 12 illustrates an example layer 1200 of a part and a plurality of lasing tasks 126 that collectively form the layer of the part. Initially, data associated with the part is received. The part is then cross-sectioned into a plurality of layers, such as a layer 1200, by the segmentation component 500. The layer 1200 is shown in reference to a build plane having coordinates.

In determining the layer 1200, the layer 1200 is also sectioned or otherwise segmented into a plurality of lasing tasks 126. The plurality of the lasing tasks 126 are shown including boxes, sections, pieces, or other boundary. Each of the lasing tasks 126 represents a task for a laser of the lasing module 102 to complete. For the layer 1200, any number of lasers may be used to complete the lasing tasks 126. However, in some instances, only a single laser may be assigned to a given lasing task 126. In some instances, the lasing tasks 126 are determined based on the geometry of the part, a size of the layer 1200, or may be based on given size constraints of the lasing tasks 126. For example, the lasing tasks 126 may have a minimum and/or a maximum area on the layer 1200. Once all the lasing tasks 126 for the layer 1200 are performed, the layer 1200 may be completed (e.g., manufactured).

In some instances, the layer 1200 is divided into lasing tasks 126 using a variety of approaches, schemes, or strategies. For example, the lasing tasks 126 may have a similar spatial envelope with certain dimensions. In some instances, the lasing tasks 126 have a similar length on one or more sides as each other. By determining the length of the one or more sides, such as a maximum length of the sides, this may constrain a maximum amount of work to be performed for the lasing task 126. That is, by controlling the size of the lasing task 126, the amount of work to be performed for completing the lasing tasks 126 may correspondingly be controlled.

Alternatively, adjusting a laser power, lasing speed, or modulating the laser in a different manner in order may affect the material differently than in a neighboring lasing task 126. Here, the boundaries of the lasing tasks 126 define an envelope where the same process settings are present (e.g., lasing power, speed, etc.). Different features such as edges, holes, or cavities may be treated differently than neighboring regions that include continuous material.

In some instances, the lasers form a contour or boundary of the lasing task 126, and then afterwards, fill in an area within the lasing tasks 126 (e.g., within the boundary). That is, the perimeter of the lasing task 126 may first be melted, and therein, an inner portion of the lasing task 126 (within the perimeter) may be melted. For example, FIG. 12 illustrates boundary lasing tasks 1202, and interior lasing tasks 1204 (within the boundary lasing tasks 1202 or a within a boundary of the layer 1200).

FIGS. 13-17 illustrate various processes related to manufacturing parts using the 3D printing system 100. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-12, although the processes may be implemented in a wide variety of other environments, architectures and systems.

FIG. 13 illustrates an example process 1300 for scheduling lasers to perform lasing tasks. In some instances, the process 1300 may be performed by the computing resource(s) 118, or components thereof, such as the scheduling component 136, the constraint component 504, and so forth.

At 1302, the process 1300 may include receiving part data associated with a part to be manufactured within/on a build module. For example, the part data may represent a part that is to be manufactured. At 1304, the process 1300 may include determining layers of the part to be manufactured within a 3D printing system. Determining the layers of the part may involve segmenting the part cross-sectionally to generate thin layers of material to be melted. Collectively, the layers form the part to be generated. In some instances, the segmentation component 500 may section the part into a plurality of layers in order to determine the layers of the part to be manufactured to form the part. At 1306, the process 1300 may include determining, for a first layer of the layers, lasing tasks to be performed by a lasing module. For example, the segmentation component 500 may determine within the layers, the lasing tasks 126 to be performed. In some instances, the lasing tasks 126 may be determined based on a maximum size (e.g., area) within the layer, shape, location, and so forth.

At 1308, the process 1300 may include determining constraints associated with performing the lasing tasks. For example, after determining the lasing tasks, the process 1300 may determine constraints for the lasing tasks. Such constraints, may include, which lasing tasks are to be performed before others and which lasing tasks cannot be performed simultaneously. Such determinations may be based on a location (e.g., position) of the lasing tasks on the first layer, an intensity of the lasers to perform the lasing tasks, a movement of the build module relative to the lasing module, a duration of the lasing tasks, a size of the lasing task (e.g., area to be melted), an orientation of the lasing task (e.g., on the build area), and so forth. In some instances, the constraints may be determined to ensure a quality of part being manufactured. However, in some instances, the constraints may be determined to maximize a throughput of parts through the lasing module. Additionally, as part of determining the constraints, the process 1300 may generate a DAG that indicates which tasks are to be performed prior to other, not consecutively with others, and so forth. In assigning lasers to the lasing tasks, the DAG ensures that certain lasing tasks will be scheduled to be performed before that of other lasing tasks.

At 1310, the process 1300 may include determining a path of the build module through the lasing module. For example, the process 1300 may determine a direction of travel of the build module relative to the lasing module. The build module may include several paths, for example, and the paths may be compared against one another to determine a most efficient path relative to the lasing module (e.g., based on the constraints) or to optimally utilize the lasers of the lasing module. Additionally, based on the path of the build module relative to the lasing module, the build module may have different positions relative to the lasers. These positions may impact which lasers are capable of performing the lasing tasks at a given instance in time. For example, as part of this, the process 1300 may determine which lasers are available or capable of performing the lasing tasks at the various positions of the build module. In some instances, however, the lasers may be limited based on tolerable incident angles with the build module, the flow of gases within, through, or relative to the processing chamber, a material build direction, and so forth.

At 1312, the process 1300 may include determining, based at least in part on the constraints and the path, a schedule of the lasers to manufacture the part. For example, the lasers may be assigned lasing tasks that the lasers are to respectively perform as the build module translates relative to the lasing module. Scheduling the lasers may include when the lasers are to respectively perform the lasing tasks, and in what order (as compared to other lasing tasks). The schedule may be determined ahead of time, prior to the part actually being manufactured.

At 1314, the process 1300 may include sending the schedule to the lasing module for performing the lasing tasks. For example, the schedule may be sent to the lasing module, and as the part (or the build module) enters the lasing module, the lasing module may cause performance of the schedule. This may include, for example, directing the lasers to perform respective lasing tasks to manufacture the layer of the part. Such lasing tasks may be performed as the build module enters the lasing module and progresses through the lasing module.

At 1316, the process 1300 may include receiving sensor data indicating a progress of the lasing tasks. For example, as the part is being manufactured within/on the build module, a progress of that part being manufactured may be received. In some instances, this may include which lasing tasks have been completed, a percentage of the lasing tasks completed, a progress of the lasing tasks (e.g., 70 percent completed, etc.), and so forth.

At 1318, the process 1300 may include updating the schedule. For example, based on the sensor data that indicates the progress of the lasing tasks, the schedule may be updated. In some instances, updating the schedule may account for delays and/or an operational status of the lasing module(s). Updating the schedule may reduce further delays and inefficiencies. The updated schedule may then be sent back to the lasing module for carrying out the updated lasing tasks.

As such, the process 1300 determines a schedule that represents a list of lasing tasks to be performed. The lasing tasks are matched, or pair, with respective lasers of the lasing module to minimize downtown of the lasers and increase throughput. Each laser of the lasing module may have a respective queue of lasing tasks to be performed, as well as order in which the lasing tasks are to be performed. Still, the lasing tasks may be associated with a respective instance in time such that certain lasing tasks are performed prior to others, simultaneous with other, non-simultaneous with one another, and so forth. The lasing tasks are also scheduled in a manner that satisfies the constraints.

Figure 14:
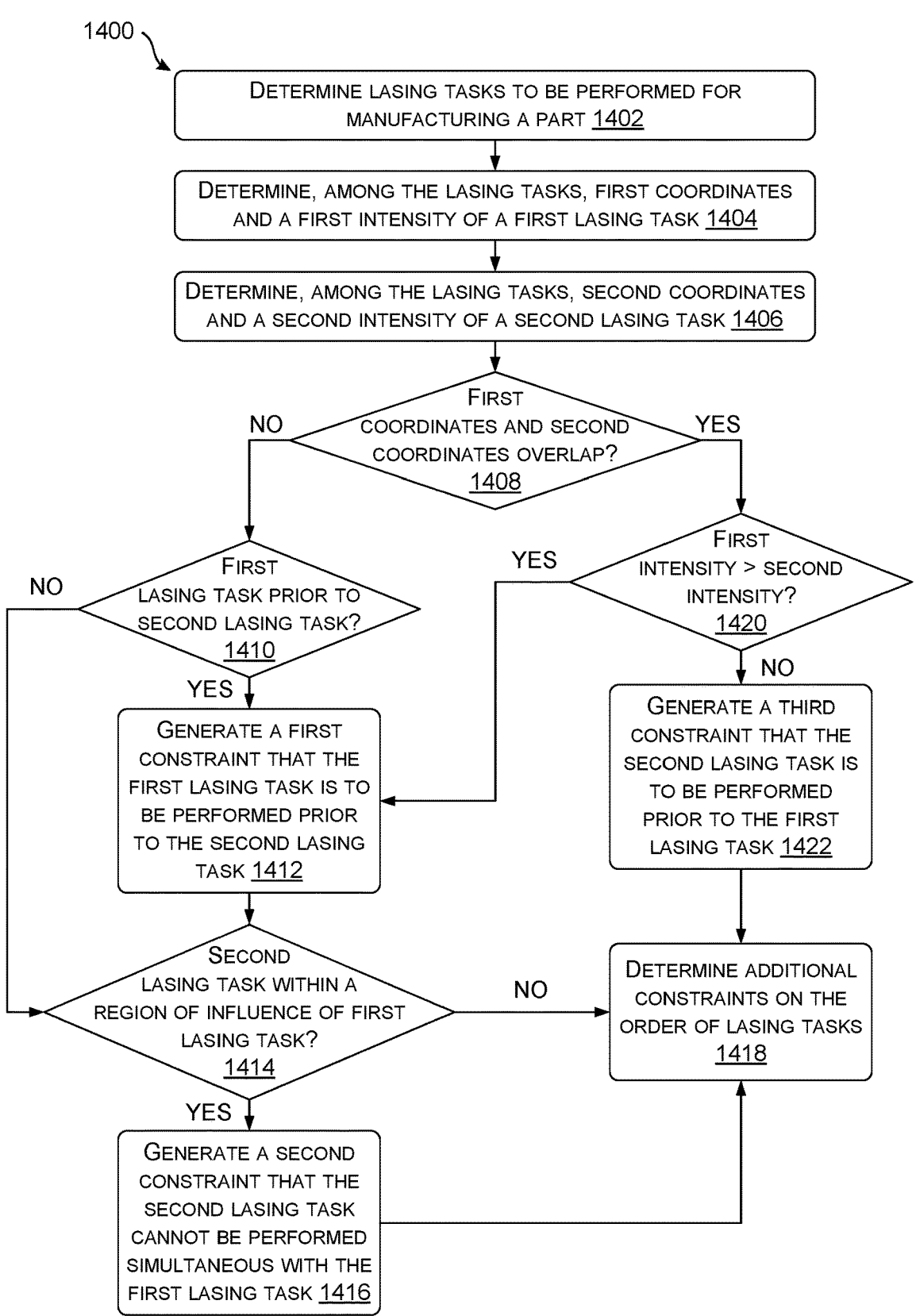
FIG. 14 illustrates an example process for determining constraints associated with scheduling lasing tasks for one or more 3D printing systems, according to an example of the present disclosure.

FIG. 14 illustrates an example process 1400 for determining constraints associated with scheduling lasing tasks. In some instances, the computing resource(s) 118, or components thereof, such as the scheduling component 136, the constraint component 504, and so forth, may perform the process 1400.

At 1402, the process 1400 may include determining lasing tasks to be performed for manufacturing a part. For example, the segmentation component 500 may determine layers of a part to manufactured, and within the layers, determine the lasing tasks 126 to be performed. As discussed herein, by determining the lasing tasks 126, lasers may be assigned to the lasing tasks for manufacturing the part (or the layers of the part).

At 1404, the process 1400 may include determining, among the lasing tasks, first coordinates and a first intensity of a first lasing task. For example, the location of the first lasing task may be expressed as coordinates within/on a build area. The first coordinates may indicate a boundary or perimeter of the first lasing task, or the location on the build area corresponding to the first lasing task. As an example, the first lasing task may span between a first X-position and a second X-position, as well as a first Y-position and a second Y-position on the build area. These positions may be expressed as coordinates (X,Y). Additionally, a lasing intensity associated with performing the first lasing task may be determined. The lasing intensity may be indicative of an amount of lasing power required to perform the first lasing task. In some instances, the lasing intensity may be based on a size of the lasing task, whether the lasing task forms a portion of a perimeter of the layer, the powdered metal being melted, and so forth.

At 1406, the process 1400 may include determining, among the lasing tasks, second coordinates and a second intensity of a second lasing task. For example, the location of the second lasing task may be expressed as coordinates within/on the build area. The second coordinates may indicate a boundary or perimeter of the second lasing task, or the location on the build area corresponding to the second lasing task. As an example, the second lasing task may span between a third X-position and a fourth X-position, as well as a third Y-position and a fourth Y-position on the build area. These positions may be expressed as coordinates (X,Y). Additionally, a lasing intensity associated with performing the second lasing task may be determined. The lasing intensity may be indicative of an amount of lasing power required to perform the second lasing task.

At 1408, the process 1400 may include determining whether the first coordinates and the second coordinates overlap. For example, the first coordinates and the second coordinates may be compared or referenced against one another to determine whether the coordinates overlap along one or more axes (e.g., X-axis or Y-axis). If the X-coordinates of the first lasing task are at least partially the same as X-coordinates of the second lasing task, or if the Y-coordinates of the first lasing task are at least partially the same as Y-coordinates of the second lasing task, then the first coordinates and the second coordinates may at least partially overlap. In some instances, the scheduling component 136 may determine whether the coordinates of the first lasing task and the second lasing task overlap. If at 1408 the process 1400 determines that the first coordinates and the second coordinates are different, or do not overlap, the process 1400 may follow the "NO" route and proceed to 1410.

At 1410, the process 1400 may include determining whether the first lasing task is prior to the second lasing task. For example, the first coordinates and the second coordinates may be compared to determine whether the first lasing task is before the second lasing task, relative to a direction of the build module relative to the lasing module. For example, the build module may translate through the lasing module in a direction along the X-axis. Relative to the direction of travel, the process 1400 may determine whether the first lasing task is prior to the second lasing task. In other words, the process 1400 may determine whether the first lasing task assigned to a particular region of the build area will enter the lasing module prior to the second lasing task, which is also assigned to a particular region of the build area. To make such determination, the process 1400 may compare the X-coordinates of the first lasing module and the second lasing module. If at 1410 the process 1400 determines that the first lasing task is prior to the second lasing task, the process 1400 may follow the "YES" route and proceed to 1412.

At 1412, the process 1400 may include generating a first constraint that the first lasing task is to be performed prior to the second lasing task. For example, to reduce "backtracking" across the build area, the lasing tasks may be performed in sequential order as the lasing tasks enter the lasing module (e.g., come within view of the lasers) and as the lasing tasks traverse relative to the lasing module. In other words, the lasing tasks may be performed based on their location relative to a direction of travel of the build module through the lasing module.

From 1412, the process 1400 may proceed to 1414 whereby the process 1400 may include determining whether the second lasing task is within a region of influence of the first lasing task. The process 1400 may also proceed to 1414 following the "NO" route from 1410. The region of influence of the first lasing task may represent an area around the first lasing task that is influenced during performance of the first lasing task. For example, while performing the first lasing task, debris, gases, and soot generated may potentially interfere with other lasing operations. In some instances, the region of influence may be based on the first lasing power of the first lasing task, a location of the first lasing task, a size of the first lasing task, a direction of exhaust relative to the lasing module (e.g., within the processing chamber), and so forth. The region of influence may be associated with coordinate positions on the build area, and to determine whether the second lasing task is within the region of influence, the coordinate positions of the second lasing task may be compared against those of the region of influence. If the second lasing task is within the region of influence, the process 1400 may follow the "YES" route and proceed to 1416.

At 1416, the process 1400 may include generating a second constraint that the second lasing task cannot be performed simultaneous with the first lasing task. For example, because the second lasing task is located with the region of influence, and to reduce an impact of the off gases, soot, and debris on the second lasing task, the second constraint may indicate that the second lasing task cannot be performed at the same time as the first lasing task. Instead, the second lasing task may be performed after completion of the first lasing task, or some amount of time thereafter, to limit the interference with the lasers performing the second lasing task.

Alternatively, if at 1414 the process 1400 determines that the second lasing task is not within the region of influence, the process 1400 may follow the "NO" route and proceed to 1418. At 1418, the process 1400 may include determining additional constrains on the order of the lasing tasks (e.g., a third lasing task, a fourth lasing task, and so forth). That is, the process 1400 may proceed to determining additional constraints for additional lasing tasks. The process 1400 also illustrates that from 1416, the process 1400 may proceed to 1418, after determining the second constraint. Additionally, the process 1400 may determine constraints for other lasing tasks on different layers. Still, while the above discussion is with regard to determining constraints for a single part, a similar process may be performed for different lasing tasks of different parts.

If at 1408 the process 1400 determines that the first coordinates and the second coordinates overlap, the process 1400 may proceed to 1420. At 1420, the process 1400 may include determining whether the first intensity is greater than the second intensity. For example, a laser intensity required to melt the powdered metal associated with the first lasing task may be compared against a laser intensity required to melt the powdered metal associated with the second lasing task. Comparing the laser intensities may ensure that lasing tasks are performed in decreasing power to avoid destructing previous lasing tasks. For example, lasing tasks with a high laser intensity may melt or destroy previous lasing tasks. If at 1420 the process 1400 determines that the first intensity is greater than the second intensity, the process 1400 may follow the "YES" route and proceed to 1412. Alternatively, if at 1420 the process 1400 determines that the first intensity is not greater than the second intensity, the process 1400 may follow the "NO" route and proceed to 1422.

At 1422, the process 1400 may include generating a third constraint that the second lasing task is to be performed prior to the first lasing task. Such constraint, as noted above, may reduce or eliminate potential damage being done to the first lasing task (if performed first). As such, in instances where lasing tasks at least partially overlap, the lasing tasks may be performed in decreasing intensity to reduce damage to previously performed lasing tasks. From 1422, the process 1400 may proceed to 1418 to determine additional constraints of the order of the lasing tasks.

In some instances, constraints as discussed in the process 1400 are illustrative, and in some instances, other constraints may be implemented. For example, the constraints may be flexible and may be tailored based on customer needs. For example, relaxing or reducing some of the constraints (e.g., a size of the region of influence), may allow higher throughput and/or more options when assigning lasers to the lasing tasks.

FIG. 15 illustrates an example process 1500 associated with updating a schedule of the lasing tasks. In some instances, the process 1500 may be performed by the lasing module 102.

At 1502, the process 1500 may include receiving a first schedule associated with performing lasing tasks to manufacture a layer of a part. For example, a lasing module may receive the first schedule from the computing resource(s) 118 that identifies the lasing tasks to be performed by the lasing module. The schedule may identify respective schedules for the lasers of the lasing module, such as a queue of lasing tasks that the lasers are to respectively perform.

At 1504, the process 1500 may include receiving first sensor data associated with the part entering the lasing module. For example, the sensor(s) of the lasing module may image or otherwise detect identifiers (e.g., markers, barcodes, fiducials, etc.) of the build module for use in determining the part entering the lasing module. In other words, by imaging the build module, the lasing module may be able to determine the part being manufactured within/on the build module.

At 1506, the process 1500 may include determining, based at least in part on the first schedule and the first sensor data, a first lasing task to be formed to manufacture the layer of the part. For example, the layer of the part may be sectioned into multiple lasing tasks, and as part of identifying the build module entering the lasing module, the lasing module may determine the first lasing task. The first lasing task may be performed in accordance with the schedule as previously determined from the computing resource(s). In other words, the lasing module may access the schedule for determining the first lasing task to be performed. The first lasing task may be a certain lasing task of a queue of lasing tasks to be performed by a respective laser of the lasing module.

At 1508, the process 1500 may include causing the first lasing task to be performed. For example, the lasing module may cause a first laser to emit a laser beam onto the build module (or the powder bed) for melting powder metal associated with the first lasing task. This may also involve causing mirror(s) or lens(es) to adjust to steer the laser beam to the first lasing task.

At 1510, the process 1500 may include receiving second sensor data associated with manufacturing the layer of the part. In some instances, the second sensor data may be generated by sensor(s) of the lasing module, sensor(s) of the build module, or other sensor(s) of the 3D printing system. The second sensor data may be associated with a progress of manufacturing the layer of the part, a location of the build module throughout the lasing module, a status or indicator of the lasers of the lasing module, a speed of the build module relative to the lasing module, or other information that may affect performance of the lasing tasks. For example, unexpected delays may be introduced into the manufacturing process, such as lasing tasks taking longer than expected, lasers being decommissioned (e.g., broke, unavailable, etc.), and so forth. These delays, for example, may impact further lasing tasks being performed, and in an effort to prevent future delays, the schedule may be adjusted or updated. As an example, if a first laser was scheduled to perform a lasing task, but the first laser becomes unavailable, the lasing module may determine a second laser capable of performing the lasing task.

At 1512, the process 1500 may include determining whether the second sensor data is indicative of a change in the schedule. For example, the lasing module may determine whether certain lasers are unavailable to perform previously scheduled tasks, whether the schedule is being followed (both in time and order), whether the build module is following a path previously determined for manufacturing the layer of the part, and so forth. If at 1512 the process 1500 determines that the second data is not indicative of a change in the schedule, or receives sensor data that does not impact the schedule, the process 1500 may follow the "NO" route and proceed to 1514.

At 1514, the process 1500 may include determining, based at least in part on the first schedule and the first sensor data, a second lasing task to be formed to manufacture the layer of the part. For example, as noted above, the layer of the part may be sectioned into multiple lasing tasks, and as part of identifying the build module entering the lasing module, the lasing module may determine the second lasing task. The second lasing task may be a certain lasing task of a queue of lasing tasks to be performed by a respective laser of the lasing module, after the first lasing task.

At 1516, the process 1500 may include causing the second lasing task to be performed. For example, the lasing module may cause the first laser, or a second laser, to emit a laser beam onto the build module (or the powder bed) for melting powder metal associated with the second lasing task. This may also involve causing mirror(s) or lens(es) to adjust to steer the laser beam to the second lasing task.

Alternatively, if at 1512 the process 1500 determines that the second data is indicative of a change in the schedule, or receives sensor data that may impact the schedule, the process 1500 may follow the "YES" route and proceed to 1518. For example, at 1518 the process 1500 may include determining, based at least in part on the second sensor data, a second schedule associated with performing a third lasing task to manufacture the layer of the part. Continuing with the above example, if a laser once assigned to a lasing task is unavailable, the process 1500 may determine another laser that is available to perform the lasing task. In some instances, determining the second schedule may be based on the first schedule, for example, indicating the order in which the lasing tasks are to be performed. However, here, for example, the second schedule may indicate a new laser to perform the lasing task. Additionally, as part of determining the second schedule, a path of the build module relative to the lasing module may be determined. The DAG may be used to determine the second schedule.

At 1520, the process 1500 may include causing the third lasing task to be performed. For example, the lasing module may cause the third lasing task to be performed in accordance with the newly determined second schedule.

The process 1500 therefore illustrates that a first schedule is determined (e.g., off line) and then updated in real-time (e.g., online) to account for changing conditions (e.g., lasers unavailable). The first schedule as determined by the computing resource(s) 118, for example, may pre-compute a variety of schedules and the one of these schedules may be selected based on the sensed conditions. In this manner, the computing resource(s) 118 pre-compute plausible schedules (e.g., pairings of lasing tasks to lasers) and then based on the current conditions, one of the schedules is selected for being performed.

In some instances, the schedules of the lasing tasks may not change based on changing conditions. For example, even if certain lasers become unavailable or certain lasing tasks are delayed, the lasing tasks for generating a layer of the part may still be the same. In other words, to form the layer of the part, the same lasing tasks are performed. However, the timing of the lasing tasks or the order in which the lasing tasks are performed may be changed.

Although the process 1500 illustrates a schedule for a single lasing module, or a certain number of lasers for the lasing module, schedules may be determined for other lasing modules and/or other lasers of the lasing module. In such instances, the lasers of the lasing module may be scheduled to perform respective schedules, as well as be updated based on changing conditions.

FIG. 16 illustrates an example process 1600 for determining schedules and sending the schedules to components of the 3D printing system 100. In some instances, the process 1600 may be performed by the computing resource(s) 118.

At 1602, the process 1600 may include determining first schedules for first lasers of a first lasing module. For example, the scheduling component 136 may determine, for the first lasers of the first lasing module, lasing tasks of the first lasers for manufacturing a layer of a part. The first schedules, for example, may indicate for each first lasers, a queue of lasing tasks that the first lasers are to perform. The first schedules may indicate an order in which the first lasing tasks are to be performed, as well as a time in which the first lasing tasks are to be performed. The first schedules, for example, may be determined via constraints previously determined. In some instances, the first schedules may be associated with manufacturing a particular layer of a part, multiple layers of the part, or layers of parts across one or more build modules disposed beneath the first lasing module.

At 1604, the process 1600 may include sending first data associated with the first schedules to the first lasing module. For example, the computing resource(s) 118 may transmit data associated with the first schedules to the first lasing module. The first lasing module may therein use the first data to control the first lasers. For example, the first lasing module may cause the first lasers to respectively perform the first schedules, as respectively indicated in the first schedules. In some instances, this includes actuating mirror(s) to steer the first towards particular areas on the build module, adjust lens(es) to change a spot size of the laser beams, and so forth.

At 1606, the process 1600 may send second data associated with the first schedules to a conveyor system. For example, the computing resource(s) 118 may send the second data to the conveyor system 108, such that the conveyor system 108 may direct the build modules 104 to respective lasing modules for causing the first schedules to be performed. That is, the first lasing module, or the first lasers therein, are scheduled to perform the lasing tasks within the first schedules, and the conveyor system 108 may guide or direct the build modules to the first lasing module such that the first schedules may be carried out by the first lasing module. In some instances, this may include the conveyor system actuate certain motors, turntables, and so forth for directing the build modules to the first lasing module.

At 1608, the process 1600 may include determining second schedules for second lasers of a second lasing module. For example, the scheduling component 136 may determine, for the second lasers of the second lasing module, lasing tasks of the second lasers for manufacturing a layer of a part. The second schedules, for example, may indicate for each second lasers, a queue of lasing tasks that the second lasers are to perform. The second schedules may indicate an order in which the second lasing tasks are to be performed, as well as a time in which the second lasing tasks are to be performed. The second schedules, for example, may be determined via constraints previously determined. In some instances, the second schedules may be associated with manufacturing a particular layer of a part, multiple layers of the part, or layers of parts across one or more build modules disposed beneath the second lasing module.

At 1610, the process 1600 may include sending third data associated with the second schedules to the second lasing module. For example, the computing resource(s) 118 may transmit data associated with the second schedules to the second lasing module. The second lasing module may therein use the third data to control the second lasers. For example, the second lasing module may cause the second lasers to respectively perform the second schedules, as indicated in the second schedules. In some instances, this includes actuating mirror(s) to steer the first towards particular areas on the build module, adjust lens(es) to change a spot size of the laser beams, and so forth.

At 1612, the process 1600 may send fourth data associated with the second schedules to the conveyor system. For example, the computing resource(s) 118 may send the fourth data to the conveyor system 108, such that the conveyor system 108 may direct the build modules 104 to respective lasing modules for causing the second schedules to be performed. That is, the second lasing module, or the second lasers therein, are scheduled to perform the lasing tasks within the second schedules, and the conveyor system 108 may guide or direct the build modules to the second lasing module such that the second schedules may be carried out by the second lasing module. In some instances, this may include the conveyor system actuate certain motors, turntables, and so forth for directing the build modules to the second lasing module.

FIG. 17 illustrates an example process 1700 associated with optimizing a use of lasers for a lasing module, or across lasing modules. In some instances, the process 1700 may be performed by the computing resource(s) 118.

At 1702, the process 1700 may include determining a first schedule for manufacturing a layer of a first part in a first build module. For example, the scheduling component 136 may determine for a first layer of a part to be manufactured in a first build module, a first schedule for manufacturing the layer. In some instances, the first schedule may indicate the number of lasing tasks, the order in which the lasing tasks are to be performed, lasers that are to perform the lasing tasks (among a particular lasing module), and so forth.

At 1704, the process 1700 may include determining a first utilization of lasers to perform the first schedules. For example, for a particular lasing module, the process 1700 may indicate a utilization of the lasers to complete the first schedule for manufacturing the layer of the part. The utilization, for example, may indicate how many lasers are used or a percentage of the lasers within a lasing module that are utilized to perform the first schedule. For example, the utilization may indicate a 20%, 40%, 50%, and so forth utilization of the lasers. As discussed herein, the first utilization may be used for pairing the first schedule with other schedules for other building modules to maximize a utilization of the lasing module.

At 1706, the process 1700 may include determining a second schedule for manufacturing a layer of a second part in a second build module. For example, the scheduling component 136 may determine for a second layer of a part to be manufactured in a second build module, a second schedule for manufacturing the layer. In some instances, the second schedule may indicate the number of lasing tasks, the order in which the lasing tasks are to be performed, lasers that are to perform the lasing tasks (among a particular lasing module), and so forth.

At 1708, the process 1700 may include determining a second utilization of lasers to perform the second schedules. For example, for a particular lasing module, the process 1700 may indicate a utilization of the lasers to complete the second schedule for manufacturing the layer of the part. The utilization, for example, may indicate how many lasers are used or a percentage of the lasers within a lasing module that are utilized to perform the second schedule. For example, the utilization may indicate a 20%, 40%, 50%, and so forth utilization of the lasers.

At 1710, the process 1700 may include determining whether the first utilization and the second utilization are compatible. For example, whether the first utilization and the second utilization are compatible may be based on adding the utilizations together and determining whether the combined utilization is greater than a threshold and/or satisfactory. For example, if the first utilization is 20%, meaning that the first schedule utilizes 20% of the lasers for a given lasing module, a utilization may be matched with the first schedule to efficiently utilize the lasers. For example, if the second utilization is 80%, this may indicate an ideal match. In such instances, the lasers of the lasing module may be utilized. However, if the second utilization is 60% or 70%, for example, this too may represent a sufficient utilization of the lasers. As such, in an effort to increase throughput and utilization of the lasers, the process 1700 may attempt to determine schedules that are compatible.

If at 1710 the process 1700 determines that the first schedule and the second schedule are compatible, the process 1700 may follow the "YES" route and proceed to 1712. At 1712, the process 1700 may include causing the first schedule to be performed by first lasers of a first lasing module and the second schedule to be performed by second lasers of the first lasing module. In this sense, the first build module and the second build module may be directed to the same lasing module, such that the lasers of the lasing module are efficiently used to manufacture parts. As such, as the first build module and the second build module pass through the first lasing module, the lasers may be efficiently utilized for manufacturing the parts.

Comparatively, if at 1710 the process determines that the first utilization and the second utilization are not compatible, the process 1700 may follow the "NO" route and proceed to 1714. For example, the first utilization and the second utilization may not be compatible (e.g., over a threshold, such as 100 percent) or the first utilization and the second utilization may be under a threshold utilization. For example, if the first utilization is 10% and the second utilization is 10%, the combined utilization may still be less than the threshold and the process 1700 may attempt to find other schedules that are compatible with the first schedule and/or the second schedule, respectively.

At 1714, the process 1700 may cause the first schedule to be performed by first lasers of the first lasing module. For example, the first lasing module may be scheduled to perform the first schedule for manufacturing the layer of the part in the first build module. Additionally, at 1716, the process 1700 may cause the second schedule to be performed by second lasers of the second lasing module. For example, the second lasing module may be scheduled to perform the second schedule for manufacturing the layer of the part in the second build module. As such, the first schedule and the second schedule may not be paired together, but may be performed by separate lasing modules, for example.

The process 1700 therefore illustrates that in instances where a build module and the associated lasing tasks within the build module utilize a subset of the total amount of lasers, the build module may be matched with another build module that does not compete for the same lasers of the lasing modules. However, although the process 1700 illustrates an example of optimizing a utilization of the lasers, in some instances, the process 1700 may be optimized according to other parameters. For example, the lasers may be load-balanced such that tasks are evenly distributed across lasing modules within an environment. Additionally, the process 1700 may be optimized to manufacture parts in a least amount of time.

Still, in some instances, lasing modules may have varying configurations of lasers that are optimal for certain types of lasing tasks. For example, certain lasing modules may have different number of lasers, lasing modules may have a different spatial arrangements of lasers, lasing modules may have lasers with different process characteristics such as maximum lasing power, wavelength, mode of operation, etc., and/or lasing modules may designed to maintain appropriate conditions to lase different types of metals. With these considerations, schedules are generated to maximize overall throughput of the factory. As such, the 3D printing system may include multiple different lasing modules having different capabilities or configurations (e.g., different numbers of lasers, different types of lasers, different sizes of lasers, etc.). In such instances, based on the different capabilities and/or configuration of the lasing modules, the lasing modules may be scheduled to complete certain lasing tasks.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions that, when executed by the one or more processors, cause the system to perform operations comprising:
   determining a part to be manufactured using a build module of a 3D printing system,
   determining, among a plurality of layers of the part, a layer of the part to be manufactured,
   determining, among a plurality of lasing tasks associated with manufacturing the layer of the part, a first lasing task and a second lasing task,
   determining a direction of travel of the build module relative to a lasing module of the 3D printing system;
   determining at least one constraint associated with performing at least one of the first lasing task or the second lasing task,
   determining, based at least in part on the at least one constraint, that the first lasing task is to be performed prior to the second lasing task,
   determining a first laser of the lasing module of the 3D printing system to perform the first lasing task,
   determining a second laser of the lasing module of the 3D printing system to perform the second lasing task,
   generating, based at least in part on the first lasing task and the second lasing task, a schedule associated with the lasing module manufacturing the layer of the part, and
   sending, to the lasing module, data associated with the schedule, the lasing module to utilize the schedule to manufacture the part.

2. The system of claim 1, wherein the at least one constraint is based at least in part on at least one of:
   a first location of the first lasing task on the layer;
   a second location of the second lasing task on the layer;
   a direction of travel of the build module relative to the lasing module;
   a first laser intensity associated with the first lasing task;
   a second laser intensity associated with the second lasing task; or
   a region of influence associated with the first lasing task.

3. The system of claim 1, wherein the schedule indicates:
   an order in which the first lasing task and the second lasing task are to be performed by the lasing module;
   a first time associated with the first laser performing the first lasing task; and
   a second time associated with the second laser performing the second lasing task.

4. The system of claim 1, the operations further comprising determining a third laser of the lasing module of the 3D printing system to perform the first lasing task, wherein:
   the first laser performs a first portion of the first lasing task; and
   the second laser performs a second portion of the second lasing task, the second portion of the first lasing task being performed at least partially at a same time as the first portion of the first lasing task.

5. The system of claim 1, wherein the part comprises a first part and the build module comprises a first build module, the operations further comprising:
   determining a second part to be manufactured using a second build module of the 3D printing system;

determining, among a plurality of layers of the second part, a layer of the second part to be manufactured;

determining, among a plurality of second lasing tasks associated with manufacturing the layer of the second part, a third lasing task and a fourth lasing task;

determining at least one second constraint associated with performing at least one of the third lasing task or the fourth lasing task;

generating, based at least in part on the at least one second constraint, a second schedule associated with the lasing module manufacturing the layer of the second part; and sending, to the lasing module, second data associated with the second schedule.

6. The system of claim 1, the operations further comprising:

determining, among the plurality of lasing tasks associated with manufacturing the layer of the part, a third lasing task to be performed by the first laser and a fourth lasing task to be performed by the second laser; and determining at least one second constraint associated with performing at least one of the third lasing task or the fourth lasing task, wherein the schedule is further based at least in part on the third lasing task and the fourth lasing task.

7. The system of claim 1, the operations further comprising:

receiving sensor data indicative of a progress of the layer of the part being manufactured;

determining, based at least in part on the sensor data, an updated schedule associated with the lasing module manufacturing the layer of the part; and sending, to the lasing module, second data associated with the updated schedule.

8. The system of claim 7, wherein the updated schedule is based at least in part on:

an unavailable laser of the lasing module;

a manufacturing delay within the 3D printing system; or a cooling of the first lasing task.

9. A method comprising:

determining a layer of a part to be manufactured using a build module of a 3D printing system;

determining a first lasing task within the layer of the part;

determining a second lasing task within the layer of the part;

determining a first location of the first lasing task within the layer of the part;

determining a first amount of energy associated with the first lasing task;

determining a second location of the second lasing task within the layer of the part, the second location being adjacent to the first location;

determining a second amount of energy associated with the second lasing task;

determining, based at least in part on the first location, the second location, the first amount of energy, and the second amount of energy, a constraint associated with performing the second lasing task;

determining, based at least in part on the constraint, one or more lasers of a lasing module of the 3D printing system to perform the first lasing task and the second lasing task;

generating a schedule associated with the lasing module performing the first lasing task and the second lasing task; and sending data associated with the schedule that causes the lasing module to perform the first lasing task and the second lasing task.

10. The method of claim 9, wherein the constraint is associated with:

the first lasing task being performed prior to the second lasing task;

the second lasing task being performed prior to the first lasing task; or the first lasing task and the second lasing task being performed non-simultaneously.

11. The method of claim 9, wherein determining the one or more lasers of the lasing module of the 3D printing system to perform the first lasing task and the second lasing task comprises:

determining, based at least in part on a first position of the build module relative to the lasing module, a first laser to perform to the first lasing task;

determining, based at least in part on a second position of the build module relative to the lasing module, a second laser to perform the first lasing task, the second position being different than the first position;

determining, based at least in part on a third position of the build module relative to the lasing module, a third laser to perform to the second lasing task; or determining, based at least in part on a fourth position of the build module relative to the lasing module, a fourth laser to perform the second lasing task, the fourth position being different than the third position.

12. The method of claim 9, further comprising determining at least one of:

a direction of travel of the build module relative to the lasing module;

a region of influence associated with the first lasing task; or a direction of a flow of gas relative to the lasing module, wherein determining the constraint associated with performing the second lasing task is further based at least in part on at least one of the direction of travel, the region of influence, or the direction of the flow of gas.

13. The method of claim 9, further comprising:

determining one or more additional lasing tasks to be performed within the layer of the part;

determining one or more additional constraints associated with performing the one or more additional lasing tasks; and generating a directed acyclic graph (DAG) associated with the lasing module performing the first lasing task, the second lasing task, and the one or more additional lasing tasks, the DAG indicating an order and timing of the lasing module performing the first lasing task, the second lasing task, and the one or more additional lasing tasks.

14. The method of claim 9, further comprising sending second data associated with the schedule to a conveyor system, wherein the conveyor system is configured to maneuver the build module to the lasing module based at least in part on the second data.

15. The method of claim 9, further comprising:

determining a second layer of a second part to be manufactured using a second build module of the 3D printing system;

determining a third lasing task within the second layer of the part;

determining a laser of the lasing module of the 3D printing system to perform the third lasing task;

generating a second schedule associated with the laser performing the third lasing task; and sending the schedule and the second schedule to the lasing module, wherein the lasing module is configured perform the third lasing task at least partially simultaneously with the first lasing task or the second lasing task.

16. A method, comprising:

determining a layer of a part to be manufactured using a build module a 3D printing system;

determining, within the layer, lasing tasks to be performed by a lasing module of the 3D printing system for manufacturing the layer of the part;

determining constraints associated with the lasing tasks, the constraints representing one or more limitations associated with at least one of an order or a timing in which the lasing tasks are performed;

generating, based at least in part on the constraints, a first directed acyclic graph (DAG) associated with the at least one of the order or the timing in which the lasing tasks are performed;

causing the lasing module to perform the lasing tasks based at least in part on the first DAG;

receiving data associated with a melt pool of a lasing task of the lasing tasks; and generating a second DAG associated with the at least one of the order or the timing in which the lasing tasks are performed.

17. The method of claim 16, further comprising:

determining, based at least in part on the first DAG, first lasers of the lasing module configured to perform the lasing tasks;

determining, based at least in part on the first DAG, second lasers of the lasing module configured to perform the lasing tasks;

generating a first schedule associated with the first lasers performing the lasing tasks;

generating a second schedule associated with the second lasers performing the lasing tasks; and sending the first schedule and the second schedule to the lasing module.

18. The method of claim 17, wherein the lasing module is configured to select one of the first schedule or the second schedule based at least in part on:

a position of the build module relative to the lasing module;

a time associated with the build module arriving at the lasing module; or a progress of the lasing module performing one or more additional schedules.

19. The method of claim 16, further comprising:

determining a second layer of the part to be manufactured using the build module the 3D printing system;

determining, within the second layer, second lasing tasks to be performed for manufacturing the second layer of the part;

determining second constraints associated with the second lasing tasks; and generating, based at least in part on the second constraints, a second DAG associated with the at least one of the order or the timing in which the second lasing tasks are performed.

20. The method of claim 16, wherein:

the data is received from an imaging sensor; and the data is indicative of at least one of a size of the melt pool, a temperature of the melt pool, a location of the melt pool, or an energy associated with the melt pool.

* * * * *